(12) United States Patent
Takita et al.

(10) Patent No.: US 10,110,831 B2
(45) Date of Patent: Oct. 23, 2018

(54) VIDEOCONFERENCE DEVICE

(71) Applicant: Panasonic Intellectual Property Management Co., Ltd., Osaka (JP)

(72) Inventors: Takeshi Takita, Osaka (JP); Yoshimasa Honda, Osaka (JP); Masayuki Kumazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/703,147

(22) Filed: Sep. 13, 2017

(65) Prior Publication Data
US 2018/0091744 A1    Mar. 29, 2018

(30) Foreign Application Priority Data

| Sep. 27, 2016 | (JP) | 2016-188603 |
| Sep. 28, 2016 | (JP) | 2016-189555 |
| Sep. 28, 2016 | (JP) | 2016-190006 |
| Sep. 29, 2016 | (JP) | 2016-191235 |
| Jun. 6, 2017 | (JP) | 2017-111619 |

(51) Int. Cl.
*H04M 7/14*     (2006.01)
*H04N 5/262*    (2006.01)
(Continued)

(52) U.S. Cl.
CPC ......... *H04N 5/2624* (2013.01); *H04N 5/2628* (2013.01); *H04N 7/147* (2013.01); *H04N 7/15* (2013.01)

(58) Field of Classification Search
USPC ........................................ 348/14.01–14.09
See application file for complete search history.

(56) References Cited

U.S. PATENT DOCUMENTS

| 5,953,050 A | 9/1999 | Kamata et al. |
| 2010/0149308 A1 | 6/2010 | Mihara |

(Continued)

FOREIGN PATENT DOCUMENTS

| JP | 7-336660 | 12/1995 |
| JP | 9-149396 | 6/1997 |

(Continued)

*Primary Examiner* — Maria El-Zoobi
(74) *Attorney, Agent, or Firm* — Wenderoth, Lind & Ponack, L.L.P.

(57) ABSTRACT

A videoconference device displays video data from a speech site such that a viewer can easily understand even in a case where the number of sites is large. A communication controller receives each piece of video data and voice data from conference terminal devices of a plurality of other sites. A video and voice synthesizer determines a screen layout depending on the number of sites participating in a videoconference, and generates synthesized video data obtained by synthesizing video data of each site according to the screen layout. At this time, the video and voice synthesizer generates the synthesized video data such that display of the video data of each site where a level of voice data is higher than or equal to a threshold is highlighted more than display of video data of the other sites. A video and voice output controller displays the synthesized video data on a screen of a display device.

15 Claims, 19 Drawing Sheets

(51) Int. Cl.
*H04N 7/15* (2006.01)
*H04N 7/14* (2006.01)

(56) References Cited

U.S. PATENT DOCUMENTS

| | | | |
|---|---|---|---|
| 2012/0274728 A1 | 11/2012 | Yasoshima | |
| 2015/0002611 A1* | 1/2015 | Thapliyal | G10L 25/84 |
| | | | 348/14.08 |
| 2015/0002615 A1 | 1/2015 | Yasoshima | |
| 2015/0341596 A1* | 11/2015 | Noy | H04N 7/152 |
| | | | 348/14.09 |
| 2016/0105642 A1* | 4/2016 | Nagase | H04M 1/575 |
| | | | 348/14.08 |

FOREIGN PATENT DOCUMENTS

| | | |
|---|---|---|
| JP | 2005-151002 | 6/2005 |
| JP | 2010-141824 | 6/2010 |
| JP | 2012-231428 | 11/2012 |
| JP | 2014-171157 | 9/2014 |
| JP | 2015-106207 | 6/2015 |
| JP | 2016-66246 | 4/2016 |

* cited by examiner

| 1 | 2 | 3 | 4 |
|---|---|---|---|
|   | 5 | 6 | 7 |
|   | 8 | 9 | 10 |
| 13 | 14 | 15 | 16 |
| 19 | 20 | 21 | 22 |
| 11 | 12 | | |
| 17 | 18 | | |
| 23 | 24 | | |

FIG. 7B

| 1 | | 2 | 3 | 6 | 12 | 18 |
|---|---|---|---|---|---|---|
|   | 19 | 5 | 11 | 17 | 24 | |
|   |    | 4 | 10 | 16 | 23 | |
|   |    | 9 | 15 | 22 | | |
|   |    | 8 | 14 | 21 | | |
| 7 | 13 | 20 | | | | |

FIG. 7C

| 1 | | 2 | 3 | 4 | 7 |
|---|---|---|---|---|---|
|   | 19 | 8 | 9 | 10 | 13 |
|   |    | 14 | 15 | 16 | 21 |
| 20 | 5 | 11 | 17 | | |
|    | 6 | 12 | 18 | | |
| 22 | 23 | 24 | | | |

FIG. 7D

| 1 | | 2 | 4 |
|---|---|---|---|
|   | 19 | 5 | 6 |
|   |    | 7 | 8 |
| 20 | 3 | 9 | 10 |
|    |   | 14 | 16 |
|    |   | 13 | 15 |
| 12 | 18 | 22 | 24 |
| 11 | 17 | 21 | 23 |

| 2 | 3 | 6 |
|---|---|---|
| 1 | | 5 |
| | | 4 |

FIG. 18B

| 7 | 8 | 11 |
|---|---|---|
| 1 | | 10 |
| | | 9 |

FIG. 18C

| 2 | 10 | 14 |
|---|----|----|
| | 9 | 13 |
| 1 | 8 | 12 |
| | 7 | 11 |

FIG. 18D

| 2 | 18 | 22 |
|---|----|----|
| | 17 | 21 |
| 1 | 16 | 20 |
| | 15 | 19 |

FIG. 18E

| 15 | 16 | 19 |
|----|----|----|
| 1 | | 18 |
| | | 17 |

FIG. 18F

| 20 | 21 | 24 |
|----|----|----|
| 1 | | 23 |
| | | 22 |

FIG. 19A

| 2 | 3 | 6 |
|---|---|---|
| 1 | | 5 |
| | | 4 |

FIG. 19B

| 7 | 8 | 11 |
|---|---|---|
| 1 | | 10 |
| | | 9 |

FIG. 19C

| 2 | 8 | 11 |
|---|---|---|
| 1 | | 10 |
| | | 9 |

FIG. 19D

| 2 | 12 | 15 |
|---|----|----|
| 1 | | 14 |
| | | 13 |

FIG. 19E

| 16 | 17 | 20 |
|----|----|----|
| 1 | | 19 |
| | | 18 |

FIG. 19F

| 21 | 22 | 2 |
|----|----|---|
| 1 | | 24 |
| | | 23 |

VIDEOCONFERENCE DEVICE

BACKGROUND

1. Technical Field

The present disclosure relates to a videoconference device which can be simultaneously connected to devices installed at each of a plurality of sites.

2. Description of the Related Art

A videoconference system capable of performing a remote conference by connecting a plurality of sites comes into wide use. A videoconference device that simultaneously displays video data of three sites on a screen of a monitor is described in Japanese Patent Unexamined Publication No. 2012-231428.

In addition, recently, a videoconference device capable of being simultaneously connected to many sites (for example, 24 sites) is developed.

If video data from each site is displayed in regions having the same area, a display area of each video data is reduced in a case where the number of sites is large, and thus, a viewer is hard to understand video data of a site (hereinafter, referred to as "speech site") where a participant, who is speaking, is displayed.

SUMMARY

An object of the present disclosure is to provide a videoconference device which can display video data from a speech site such that a viewer can easily understand even in a case where the number of sites is large.

According to the present disclosure, a videoconference device, which is provided at a host site and is simultaneously connectable to videoconference devices of a plurality of other sites, includes a video input unit that acquires video data by capturing video of the host site; a voice input unit that acquires voice data by picking up voices of the host site; a communication controller that receives each piece of the video data and the voice data from conference terminal devices of the plurality of other sites; and a display controller that determines a screen layout depending on the number of sites participating in a videoconference, generates synthesized video data by synthesizing the video data of the respective sites in accordance with the screen layout, and displays the synthesized video data on a screen, in which the videoconference device further includes a level detector that detects a level of the voice data, and in which the display controller generates the synthesized video data such that display of video data of the respective sites having a level of the voice data higher than or equal to a threshold is highlighted more than display of video data of other sites.

According to the present disclosure, it is possible to display video data from a speech site such that a viewer easily understands, even in a case where the number of sites is large.

BRIEF DESCRIPTION OF THE DRAWINGS

FIGS. 5A to 5C are diagrams illustrating an example of a screen layout of synthesized video data displayed on the screen of the videoconference device according to Exemplary Embodiment 1 of the present disclosure;

FIGS. 6A to 6C are diagrams illustrating an example of a screen layout of synthesized video data displayed on a screen of a videoconference device according to Exemplary Embodiment 2 of the present disclosure;

FIGS. 7A to 7D are diagrams illustrating an example of a screen layout of synthesized video data displayed on a screen of a videoconference device according to Exemplary Embodiment 3 of the present disclosure;

FIGS. 8A and 8B are diagrams illustrating an example of a screen layout of synthesized video data displayed on a screen of a videoconference device according to variation of the present disclosure;

FIGS. 16A to 16E are diagrams illustrating an example of a screen layout of synthesized video data displayed on a screen of the videoconference device according to Exemplary Embodiment 7 of the present disclosure;

FIGS. 18A to 18F are diagrams illustrating an example of a screen layout of synthesized video data displayed on a screen of the videoconference device according to Exemplary Embodiment 8 of the present disclosure; and FIGS. 19A to 19F are diagrams illustrating an example of a screen layout of synthesized video data displayed on a screen of a videoconference device according to Exemplary Embodiment 9 of the present disclosure.

DETAILED DESCRIPTION

Figure 1:
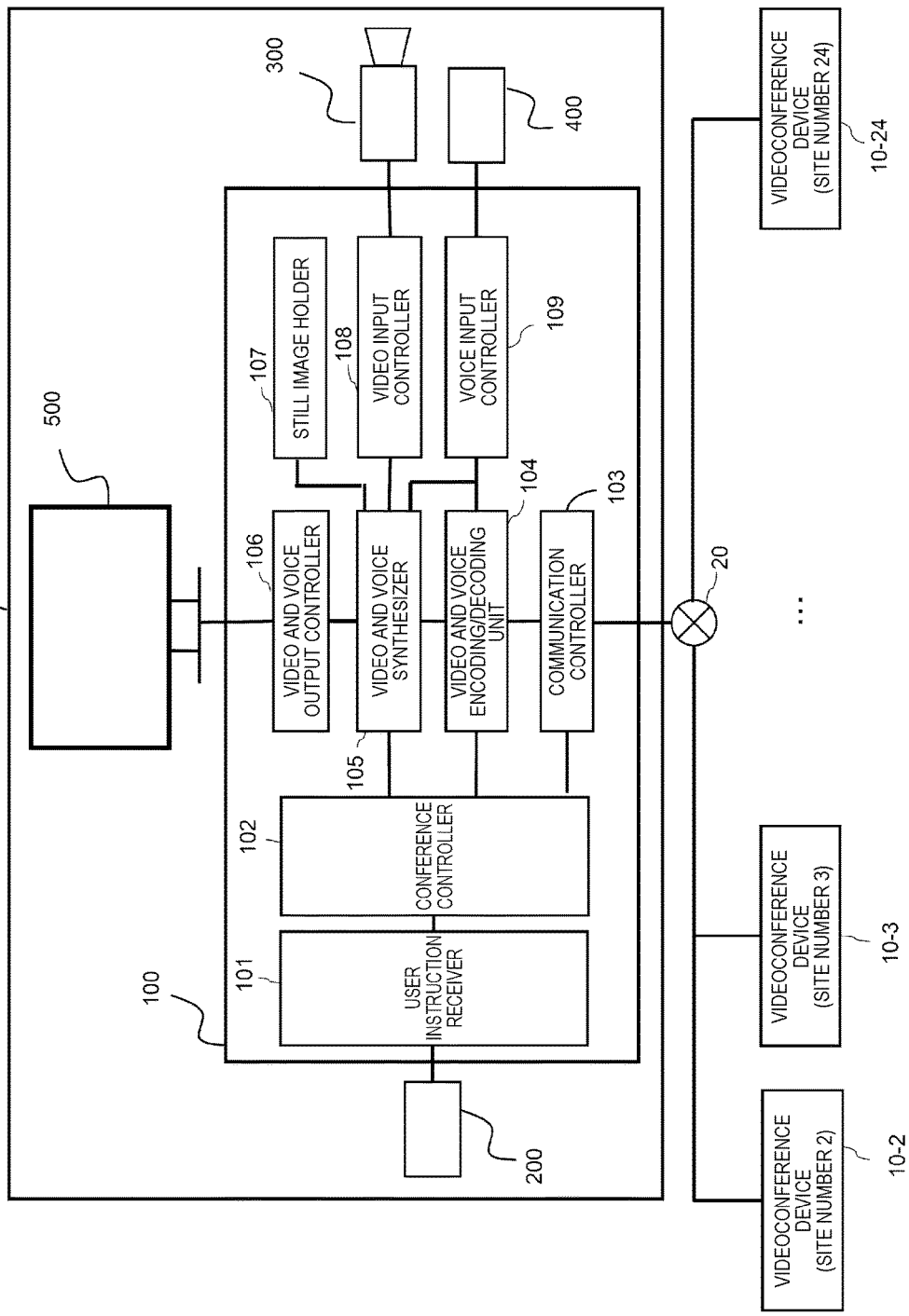
FIG. 1 is a block diagram illustrating a configuration of a videoconference device according to Exemplary Embodiment 1 of the present disclosure.

Hereinafter, embodiments of the present disclosure will be described in detail with reference to the drawings as appropriate. Hereinafter, a videoconference system in which the number of sites that can be simultaneously connected is 24 will be described as an example.

Exemplary Embodiment 1
Configuration and Connection Relationship of Videoconference Device First, configurations and connection relationships of videoconference devices 10 according to Exemplary Embodiment 1 of the present disclosure will be described in detail with reference to FIG. 1.

Videoconference devices 10 are respectively installed at each site. Videoconference device 10-1 at a host site (multisite connection device (MCU), site number 1) is connected to each of videoconference devices 10-2 to 10-24 which are respectively installed at the other sites (site numbers 2 to 24) through network 20, and transmits/receives voice data and video data. Network 20 is typically the Internet.

Videoconference device 10-1 is configured with main body device 100, user operation input device 200, video input device 300, voice input device 400, and display device 500.

Main body device 100 is connected to user operation input device 200, video input device 300, voice input device 400, and display device 500.

User operation input device 200 detects an operation for selecting a site which is performed by a user, and transmits a signal including selected site information indicating the selected site to main body device 100 in a wire or wireless manner. User operation input device 200 is typically a remote controller or a touch panel.

Video input device 300 outputs video data obtained by capturing an image of a site, where main body device 100 is installed, to main body device 100. In addition to the video data captured by a camera, the video data output from video input device 300 includes video data stored in a PC, video data reproduced by a DVD player, and the like.

Voice input device 400 outputs voice data and the like obtained by picking up voices of the site, where main body device 100 is installed, to main body device 100. In addition to voice data picked up by a microphone, the voice data output from voice input device 400 includes voice data which is a set with the video data stored in the PC, voice data which is a set with the video data reproduced by the DVD player, and the like.

Display device 500 displays the video data output from main body device 100 on a screen, and outputs the voice data output from main body device 100, from a speaker which is not illustrated.

Main body device 100 is mainly configured with user instruction receiver 101, conference controller 102, communication controller 103, video and voice encoding/decoding unit 104, video and voice synthesizer 105, video and voice output controller 106, still image holder 107, video input controller 108, and voice input controller 109. A display controller is configured by video and voice synthesizer 105 and video and voice output controller 106.

User instruction receiver 101 receives a signal transmitted from user operation input device 200, extracts selected site information included in the received signal, and outputs the extracted information to conference controller 102. The selected site information includes signal transmission destination information (IP address or ISDN number) of each site participating in the video conference.

Conference controller 102 controls timing of data input to and output from communication controller 103, video and voice encoding/decoding unit 104, and video and voice synthesizer 105, based on the selected site information input from user instruction receiver 101. In addition, conference controller 102 outputs the selected site information input from user instruction receiver 101 to video and voice synthesizer 105. In addition, conference controller 102 controls signal transmission processing and call establishment processing of communication controller 103, and monitors whether or not video data is received, based on the selected site information.

Communication controller 103 operates at timing according to control of conference controller 102. Communication controller 103 establishes a call with the other videoconference devices 10-2 to 10-24. After establishing the call, communication controller 103 receives the video data and the voice data transmitted from the other videoconference devices 10-2 to 10-24 through network 20, and outputs the video data and the voice data to video and voice encoding/decoding unit 104. In addition, after establishing the call, communication controller 103 transmits the video data and the voice data input from video and voice encoding/decoding unit 104 to the other videoconference devices 10-2 to 10-24 through network 20. Communication controller 103 operates according to a predetermined communication protocol. The communication protocol is typically SIP or H.323.

Video and voice encoding/decoding unit 104 operates at the timing according to the control of conference controller 102. Video and voice encoding/decoding unit 104 encodes video data input from video and voice synthesizer 105 and voice data input from voice input controller 109, and outputs the encoded data to communication controller 103. In addition, video and voice encoding/decoding unit 104 decodes the video data and the voice data which are output from the other videoconference devices 10-2 to 10-24 and are input from communication controller 103, and outputs the decoded data to video and voice synthesizer 105.

In addition, video and voice encoding/decoding unit 104 detects the level of the voice data of each of the videoconference devices 10-1 to 10-24, and outputs the detected result to video and voice synthesizer 105 (level detector).

Video and voice synthesizer 105 operates at the timing according to the control of conference controller 102. Video and voice synthesizer 105 generates synthesized video data by synthesizing a plurality of pieces of video data in accordance with the number of sites of the selected site information input from conference controller 102, based on the video data which is output from the other videoconference devices 10-2 to 10-24 and is input from video and voice encoding/decoding unit 104 and the video data input from video input controller 108, and outputs the synthesized video data to video and voice output controller 106. Video and voice synthesizer 105 generates the synthesized video data such that the still image held in still image holder 107 is displayed, while receiving the video data from each of videoconference devices 10-2 to 10-24.

In addition, video and voice synthesizer 105 generates the synthesized voice data by synthesizing the voice data which is output from the other videoconference devices 10-2 to 10-24 and is input from video and voice encoding/decoding unit 104 and the voice data input from voice input controller 109, and outputs the synthesized voice data to video and voice output controller 106. In addition, video and voice synthesizer 105 outputs the video data input from video input controller 108 to video and voice encoding/decoding unit 104.

In addition, video and voice synthesizer 105 recognizes a speech site in accordance with the detected result of a voice data level, and changes the synthesized video data such that highlight display of the video data of the speech site is performed.

In addition, video and voice output controller 106 displays the synthesized video data input from video and voice synthesizer 105 on a screen of display device 500 and outputs the synthesized voice data from a speaker of display device 500 as a voice.

Still image holder 107 holds still image data for displaying a predetermined still image on the screen of display device 500 in advance, during a period in which the video data is received from the other videoconference devices 10-2 to 10-24.

Video input controller 108 outputs the video data input from video input device 300 to video and voice synthesizer 105.

Voice input controller 109 outputs the voice data input from voice input device 400 to video and voice encoding/decoding unit 104 and video and voice synthesizer 105.

Transition of Connection State of Videoconference Device

Figure 2:
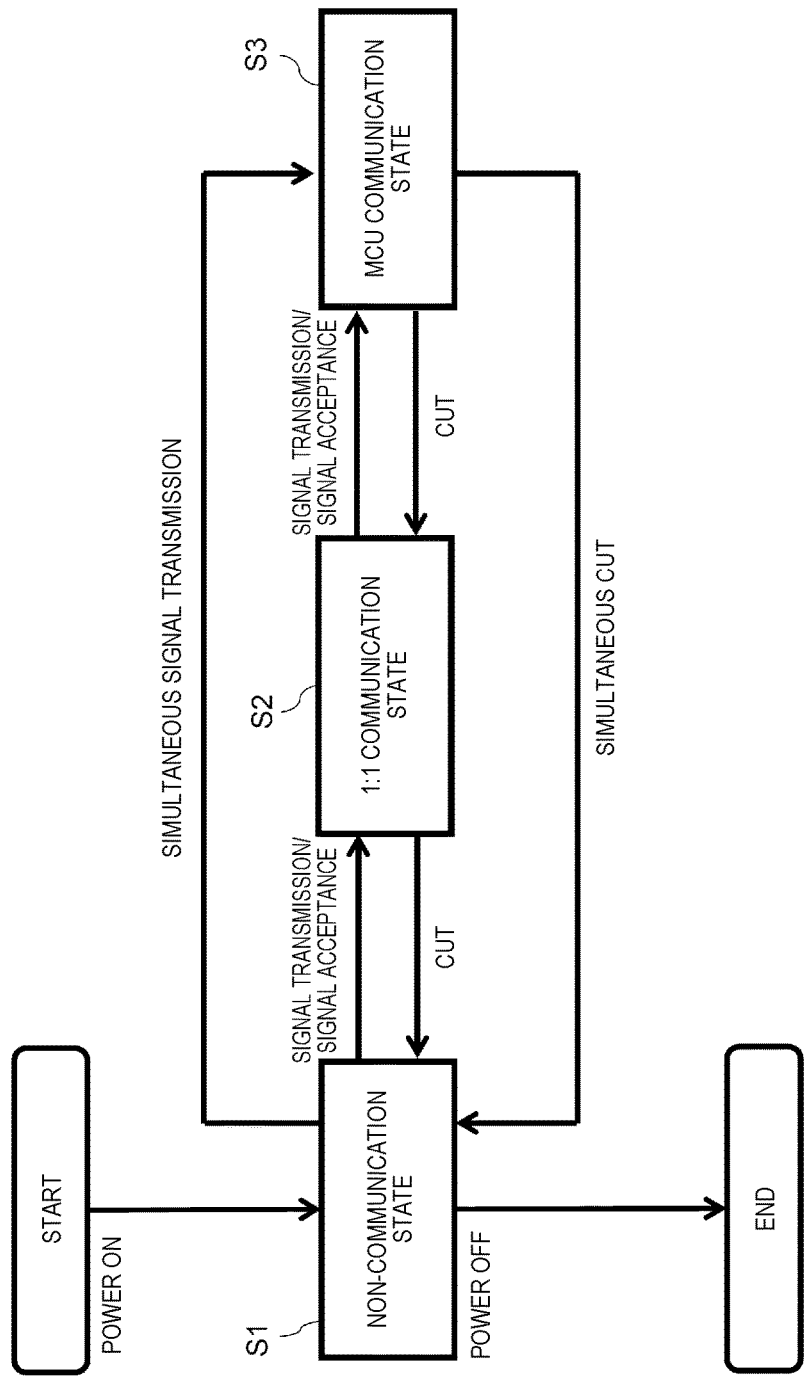
FIG. 2 is a state transition diagram illustrating transition of a state of the videoconference device according to Exemplary Embodiment 1 of the present disclosure.

Next, transition of a connection state of videoconference device 10-1 will be described in detail with reference to FIG. 2.

Videoconference device 10-1 starts an operation by turning the power on. Videoconference device 10-1 is in a non-communication state shortly after the power is turned on (S1).

Videoconference device 10-1 is connected to another videoconference device 10-i (i is any one of integers from 2 to 24), in the non-communication state (S1), thereby, being in a one-to-one communication state (1:1 communication state) with videoconference device 10-i (S2). If the connection with videoconference device 10-i in a communication state is cut in the 1:1 communication state (S2), videoconference device 10-1 enters the non-communication state (S1). Videoconference device 10-1 ends an operation by turning the power off in the non-communication state (S1).

In addition, videoconference device 10-1 is connected to still another videoconference device 10-j (j is any one of integers from 2 to 24 except for i) from the 1:1 communication state (S2), thereby entering a communication state (MCU communication state) with videoconference devices 10-i and 10-j at a plurality of sites (S3).

If the connection with videoconference device 10-j in a communication state is cut, videoconference device 10-1 enters the one-to-one communication state (S2), and furthermore, if the connection with videoconference device 10-i in a communication state is cut, videoconference device 10-1 enters the non-communication state (S1).

In addition, videoconference device 10-1 performs simultaneous signal transmission to all the other videoconference devices 10-2 to 10-24 in the non-communication state (S1), thereby, entering the communication state (MCU communication state) with all the other videoconference devices 10-2 to 10-24 (S3). If the connections with all the other videoconference devices 10-2 to 10-24 are simultaneously cut, videoconference devices 10 enter the non-communication state (S1).

A method of causing a user to manually input a signal transmission destination to videoconference device 10-1 at the time of signal transmission, a method of causing a user to select a list in which a plurality of pieces of signal transmission destination information stored in videoconference device 10-1 in advance are registered, or the like is considered as a method of performing the simultaneous signal transmission. In addition, an IP address, a telephone number, an identification code, or the like is considered as a method of specifying the signal transmission destination.

Operation of Videoconference Device

Figure 3:
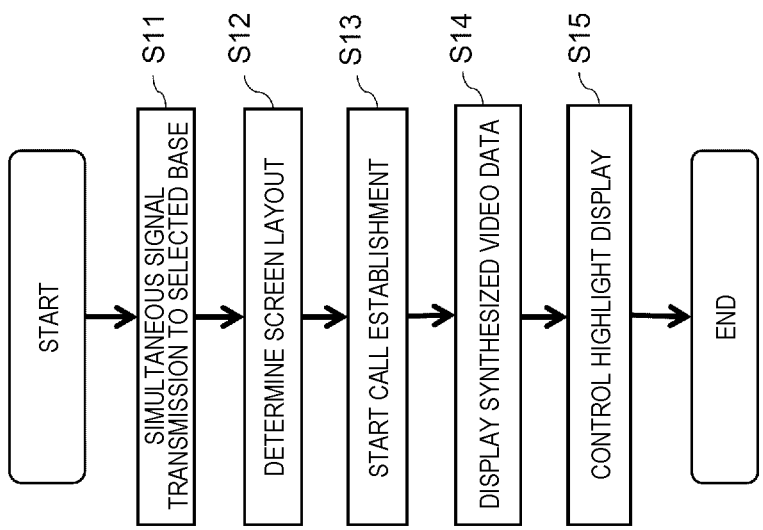
FIG. 3 is a flowchart illustrating an operation of the videoconference device according to Exemplary Embodiment 1 of the present disclosure.

Next, an operation of videoconference device 10-1 will be described in detail with reference to FIG. 3. FIG. 3 is a flowchart in a case where videoconference device 10-1 performs the simultaneous signal transmission to all the other videoconference devices 10-2 to 10-24.

First, user instruction receiver 101 receives a signal from user operation input device 200, extracts the selected site information included in the received signal, and outputs the selected site information to conference controller 102.

Conference controller 102 controls communication controller 103 such that the simultaneous signal transmission to videoconference devices 10-2 to 10-24 installed at each of N (N is an integer of 1 or more, N=23 in FIG. 3) sites of the selected site information is performed. Thereby, communication controller 103 performs the simultaneous signal transmission to videoconference devices 10-2 to 10-24 of the selected sites (S11). Specifically, in a case where the selected site information is information of one list in which a plurality of pieces of signal transmission destination information is recorded, conference controller 102 can recognize site number N based on the number of signal transmission destinations of the signal transmission destination information registered in the list.

In addition, video and voice synthesizer 105 determines a screen layout, based on the selected site information input from conference controller 102 (S12).

In addition, communication controller 103 establishes a call with each of videoconference devices 10-2 to 10-24 of other sites (S13).

Next, video and voice synthesizer 105 generates synthesized video data such that the video data of videoconference device 10-1 input from video input controller 108 and the video data of the other videoconference devices 10-2 to 10-24 are respectively displayed in corresponding divided regions of a screen layout. Video and voice output controller 106 displays initial synthesized video data input from video and voice synthesizer 105 on the screen of display device 500 (S14) (refer to FIGS. 5A and 6A). Until the video data is received from the other videoconference devices 10-2 to 10-24, still image data is displayed in the corresponding divided regions.

Next, video and voice synthesizer 105 performs a highlight display control operation (S15) for highlighting the video data of the speech site.

Figure 4:
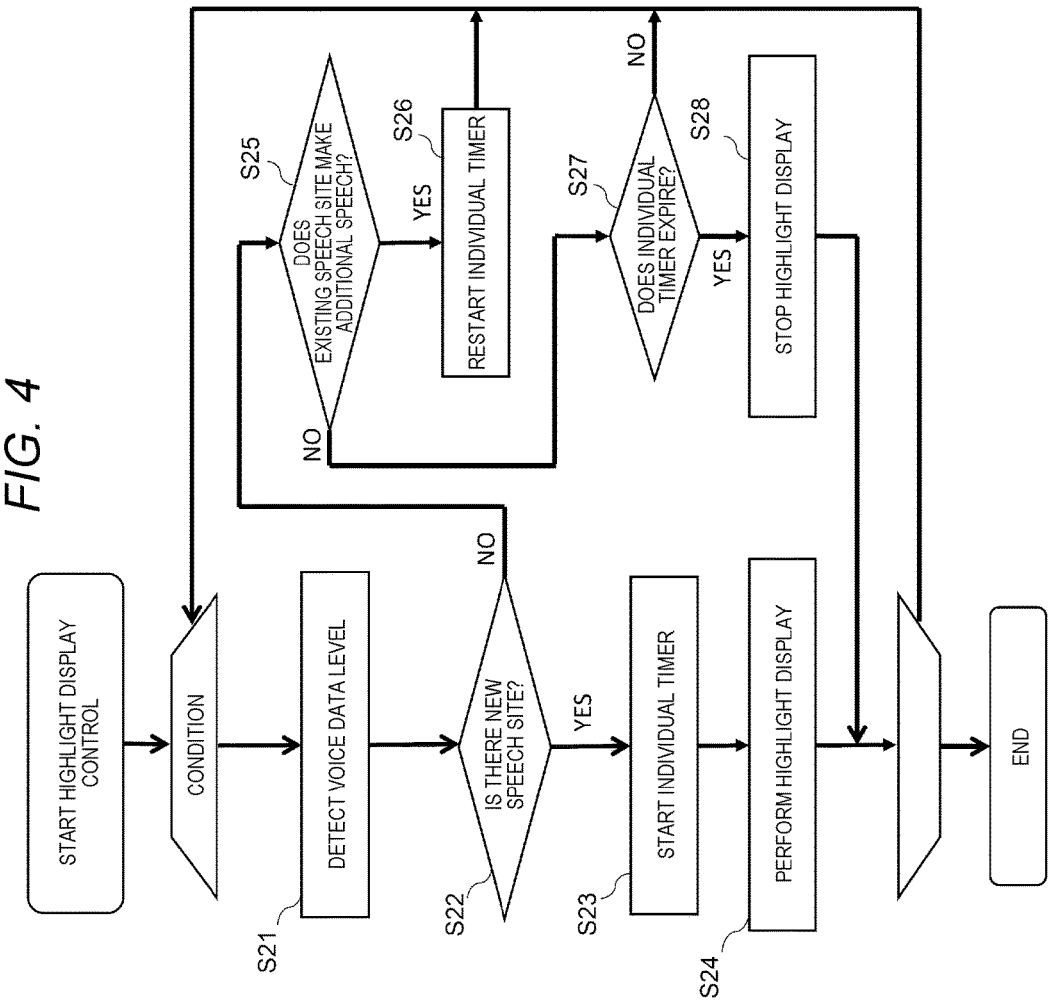
FIG. 4 is a flowchart illustrating a control operation of a screen layout of the videoconference device according to Exemplary Embodiment 1 of the present disclosure.

Hereinafter, the highlight display control operation (S15) of videoconference device 10-1 according to the present exemplary embodiment will be described in detail with reference to FIG. 4.

First, video and voice encoding/decoding unit 104 detects a level of the voice data of each of videoconference devices 10-1 to 10-24, and outputs the detected result to video and voice synthesizer 105 (S21).

Video and voice synthesizer 105 recognizes that there is a speech in a case where the level of the voice data is higher than or equal to a threshold. Video and voice synthesizer 105 determines whether or not there is a new speech site (S22).

In a case where there is a new speech site (S22: YES), video and voice synthesizer 105 starts an individual timer for the speech site (S23). In addition, video and voice synthesizer 105 generates synthesized video data such that highlight display of the video data of the speech site is performed. Video and voice output controller 106 displays new synthesized video data input from video and voice synthesizer 105 on the screen of display device 500 (S24). Thereafter, the flow returns to S21.

Meanwhile, in a case where there is no new speech site (S22: NO), video and voice synthesizer 105 determines whether or not the existing speech site makes additional speech (S25).

In a case where the existing speech site makes additional speech (S25: YES), video and voice synthesizer 105 restarts the individual timer (S26). Thereafter, the flow returns to S21.

Meanwhile, in a case where the existing speech site does not make additional speech (S25: NO), video and voice synthesizer 105 determines whether or not the individual timer expires (predetermined time T is measured) (S27).

In a case where the individual timer expires (S27: YES), video and voice synthesizer 105 generates the synthesized video data in which the highlight display of the speech site is canceled. Video and voice output controller 106 displays new updated synthesized video data input from video and voice synthesizer 105 on the screen of display device 500 (S28). Thereafter, the flow returns to S21.

In a case where the individual timer does not expire (S27: NO), the flow returns to S21.

Specific Example of Screen Layout

Next, a specific example of the screen layout of the synthesized video data generated by video and voice synthesizer 105 will be described in detail with reference to FIG. 5. In FIG. 5, numbers marked in each region in the screen correspond to site numbers. For example, the video data captured by videoconference device 10-1 of the site number 1 is displayed in the region marked "1".

Figures 5A, 5B, 5C:
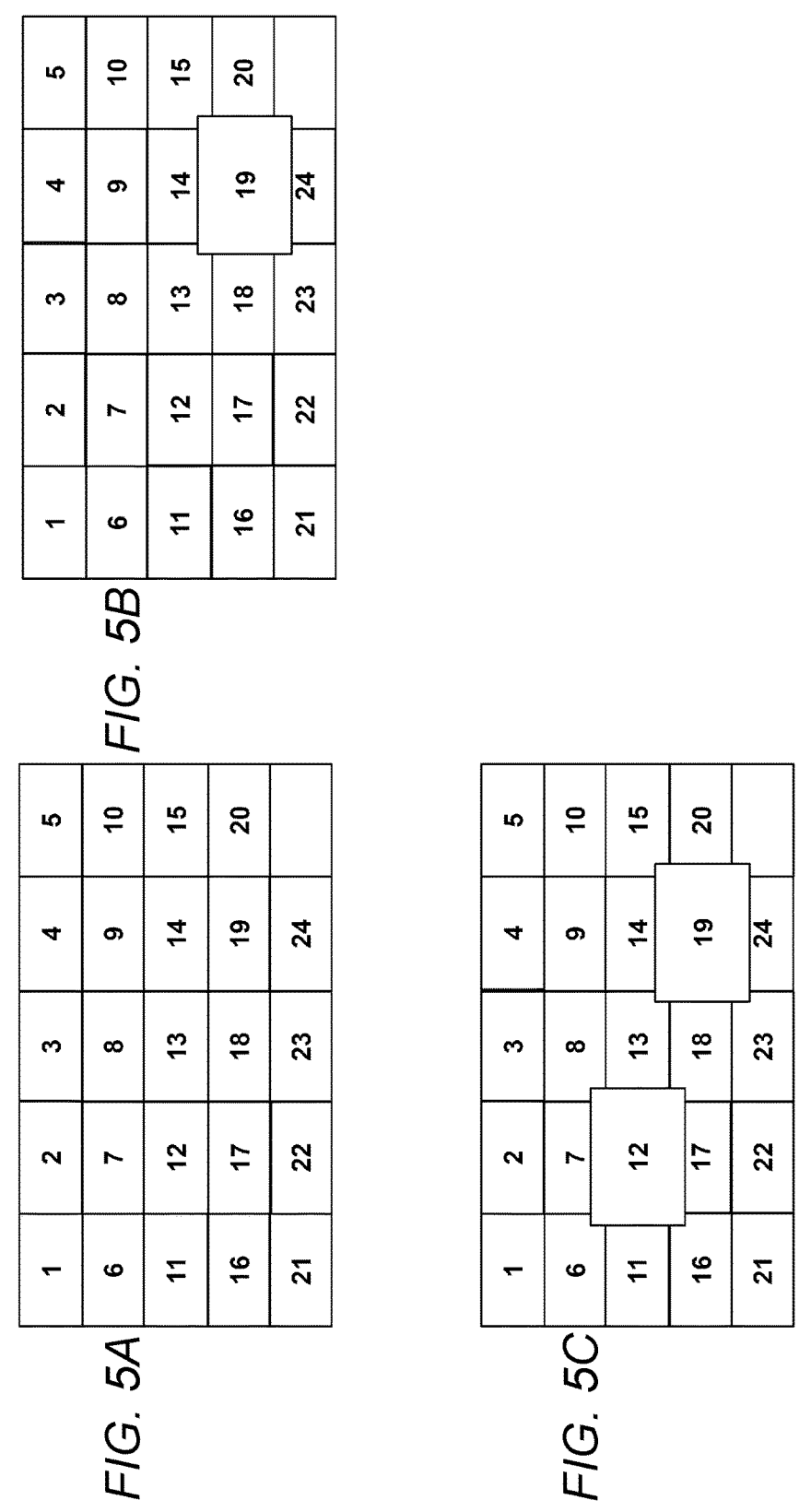

As illustrated in FIG. 5A, layout of the synthesized video data is made such that the video data (or still image data) of a corresponding site is displayed in each region divided into (N+1) pieces or more (24 in FIG. 5A).

In a state where the synthesized video data illustrated in FIG. 5A is displayed, in a case where a participant of a site number 19 makes a new speech, videoconference device 10-1 changes the synthesized video data such that a display region of the video data of the speech site (site number 19) is enlarged, as illustrated in FIG. 5B. By enlarging the display region of the video data of the speech site, the speech site is highlighted.

Thereafter, in a case where a participant of a site number 12 makes a new speech, videoconference device 10-1 changes the synthesized video data such that the display regions of the video data of all the speech sites (site numbers 12 and 19) are enlarged, as illustrated in FIG. 5C.

Effect

As such, in the present exemplary embodiment, synthesized video data is generated such that a display area of the video data of the speech site is larger than a display area of the video data of the other sites. Thereby, even in a case where the number of sites is large, it is possible to display the video data from the speech site such that a viewer easily understands.

Exemplary Embodiment 2

In Exemplary Embodiment 1 described above, a case where the display region of the video data of the speech site is enlarged is described as a highlight display control, but, in Exemplary Embodiment 2, a case where a display method of the video data of the speech site is changed will be described.

Since configurations and connection relationships of videoconference devices 10 according to the present exemplary embodiment are the same as those which are described in Exemplary Embodiment 1 and are illustrated in FIG. 1, description thereof will be omitted. In addition, since an operation of videoconference device 10-1 according to the present exemplary embodiment is the same as those which are described in Exemplary Embodiment 1 and are illustrated in FIGS. 3 and 4, description thereof will be omitted.

Specific Example of Screen Layout

Next, a specific example of the screen layout of the synthesized video data generated by the video and voice synthesizer 105 will be described in detail with reference to FIG. 6. In FIG. 6, numbers marked in each region in the screen correspond to the site numbers. For example, video data captured by videoconference device 10-1 of the site number 1 is displayed in the region marked "1".

Figures 6A, 6B, 6C:
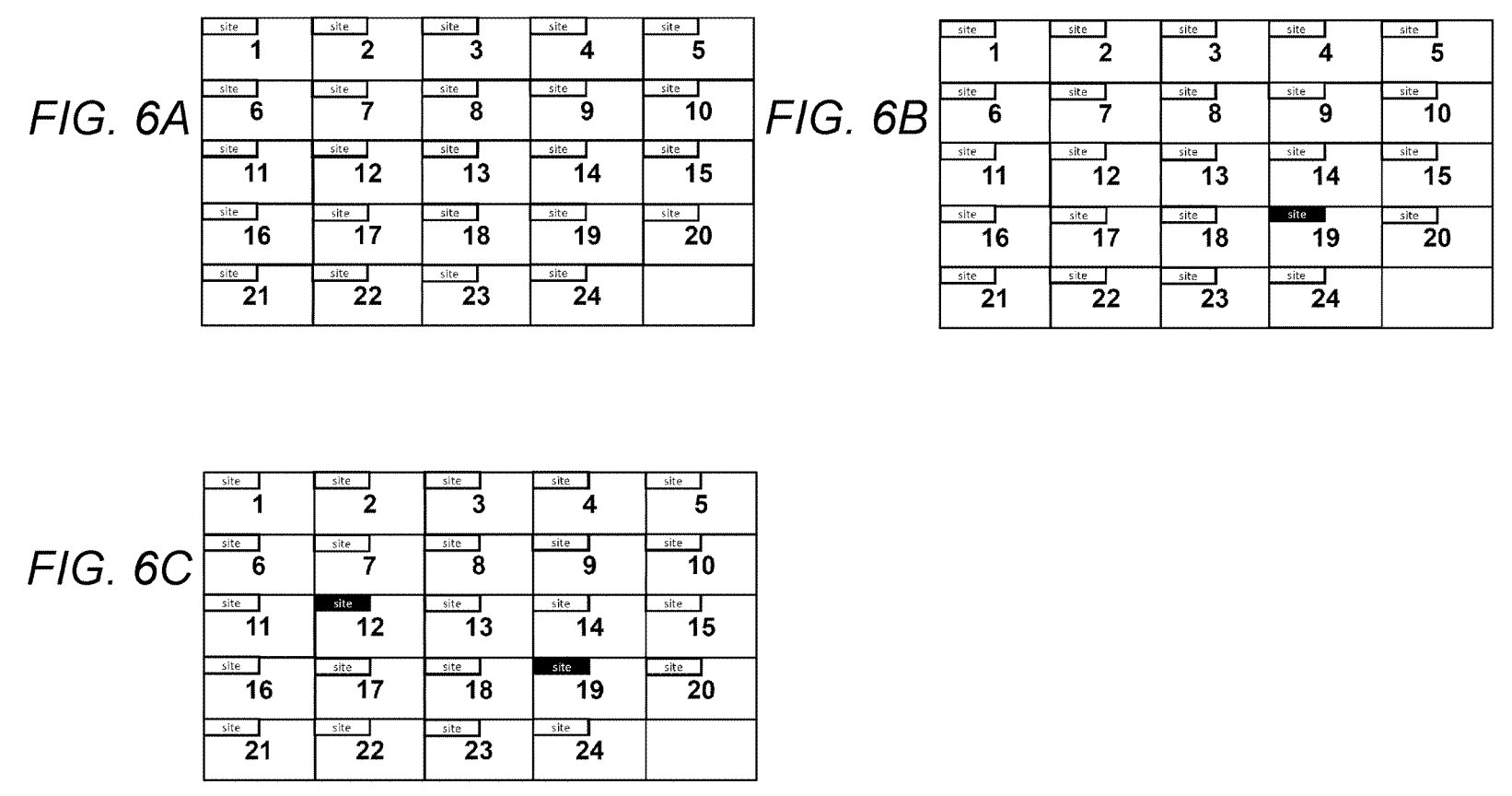

As illustrated in FIG. 6A, layout of the synthesized video data is made such that the video data (or still image data) of a corresponding site is displayed in each region divided into (N+1) pieces or more (24 in FIG. 6A). At this time, site information such as an IP address and a site name of the corresponding site is displayed on a left shoulder portion of the video data of each site. For the sake of simple description In FIG. 6, they are all illustrated as "site". Hereinafter, it is assumed that "site" of video data indicates site information.

In a state where the synthesized video data illustrated in FIG. 6A is displayed, in a case where a participant of the site number 19 makes a new speech, videoconference device 10-1 generates the synthesized video data in which a display method of "site" of the video data of the speech site (site number 19) is changed as illustrated in FIG. 6B. By changing the display method of a part of the video data of the speech site, the speech site is highlighted. There are inverted patterns as illustrated in FIG. 6B or patterns whose colors are changes, as pattern of a change of the display method.

Thereafter, furthermore, in a case where a participant of the site number 12 makes a new speech, videoconference device 10-1 generates synthesized video data in which display of "site" of the video data of all the speech sites (site numbers 12 and 19) is changed as illustrated in FIG. 6C.

Effect

As such, in the present exemplary embodiment, the synthesized video data is generated such that the display method of the video data of the speech site differs from a display method of the video data of the other sites. Thereby, even in a case where the number of sites is large, it is possible to display the video data from the speech site such that a viewer can easily understand.

Exemplary Embodiment 3

In Exemplary Embodiment 1 described above, a case where the display region of the video data of the speech site is enlarged is described as a highlight display control, but, in Exemplary Embodiment 3, a case where the display region of the video data of the speech site is enlarged and a display position is changed will be described.

Since configurations and connection relationships of videoconference devices 10 according to the present exemplary embodiment are the same as those which are described in Exemplary Embodiment 1 and are illustrated in FIG. 1, description thereof will be omitted. In addition, an operation of videoconference device 10-1 according to the present exemplary embodiment is the same as that which is described in Exemplary Embodiment 1 and is illustrated in FIGS. 3 and 4, description thereof will be omitted.

Specific Example of Screen Layout

Next, a specific example of the screen layout of the synthesized video data generated by video and voice synthesizer 105 will be described in detail with reference to FIG. 7. In FIG. 7, numbers in each region in the screen corresponds to the site numbers. For example, the video data captured by videoconference device 10-1 of the site number 1 is displayed in the region marked "1".

In a state where the synthesized video data illustrated in FIG. 5A is displayed, in a case where a participant of the site number 1 makes new speech, videoconference device 10-1 enlarges the display region of the video data of the speech site (site number 1), and changes the synthesized video data so as to change the display position, as illustrated in FIG. 7A.

Thereafter, furthermore, in a case where a participant of the site number 19 makes a new speech, videoconference device 10-1 enlarges the display region of the video data of all the speech sites (site numbers 1 and 19), and changes the synthesized video data so as to change the display position, as illustrated in FIG. 7B.

Thereafter, furthermore, in a case where a participant of the site number 20 makes a new speech, videoconference device 10-1 enlarges the display region of the video data of all the speech sites (site numbers 1, 19, and 20), and changes the synthesized video data so as to change the display position, as illustrated in FIG. 7C.

Thereafter, furthermore, in a case where a participant of the site number 3 makes a new speech, videoconference device 10-1 enlarges the display region of the video data of all of the speech sites (site numbers 1, 19, 20, and 3), and changes the synthesized video data so as to change the display position, as illustrated in FIG. 7D.

Effect

As such, in the present exemplary embodiment, the synthesized video data is generated such that a display area of the video data of the speech site is larger than a display area of the video data of the other sites and the display position of the video data of the speech site is changed. Thereby, even in a case where the number of sites is large, it is possible to display the video data from the speech site such that a viewer can easily understand.

Variation

Figures 8A, 8B:
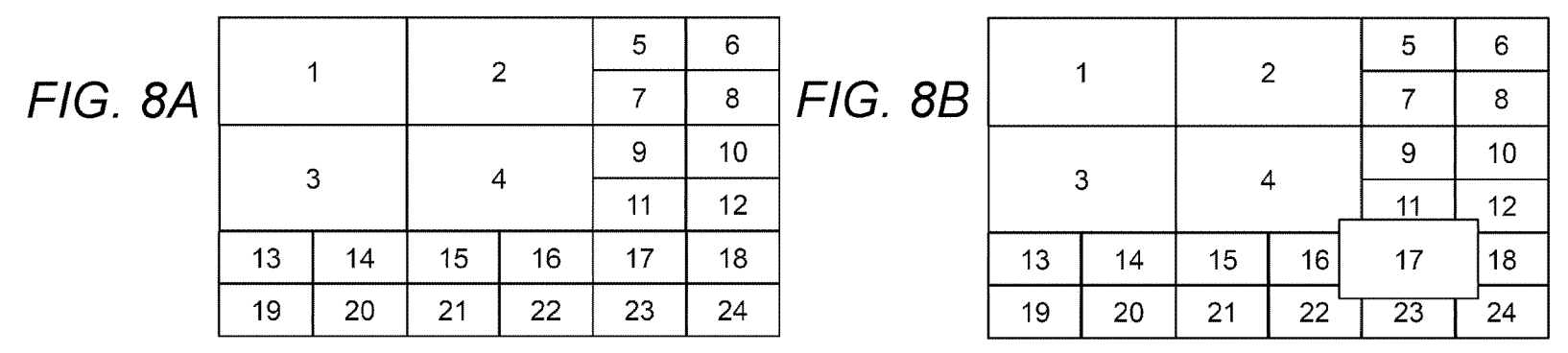

In the present disclosure, in a case where the speech site in which the participant, who is mainly speaking, is displayed and an audience site in which the participant, who is basically listening without speaking, is displayed are determined in advance, highlight display of the video data of the speech site may be always performed such as making the display area of the video data of the speech site (site numbers 1, 2, 3, and 4 in FIG. 8A) be larger than the display area of the video data of the audience site, as illustrated in FIG. 8A.

Furthermore, in a case where the participant at the audience site speaks, such as when asking a question, highlight display of the video data of the audience site may be performed such as making the display area of the video data of the audience site (site number 17 in FIG. 8B) be larger than the display area of the video data of the other audience sites, as illustrated in FIG. 8B.

In the present disclosure, types, arrangement, the number, and the like of members are not limited to the aforementioned embodiments, and the present disclosure may be appropriately modified in a range without departing from the gist of the disclosure, such as appropriately replacing the configuration elements with configuration elements having the same action effects.

Specifically, in the aforementioned exemplary embodiment, a case where a still image is displayed until video is displayed is described, but the present disclosure is not limited to this, and character information such as a message other than the still image may be displayed, or a black screen may be displayed as it is.

In addition, in the aforementioned embodiment, a videoconference system in which the number of sites that can be simultaneously connected is 24 is described as an example, but the present disclosure is not limited to the number of sites that can be simultaneously connected.

In addition, in the present disclosure, the video data for display and the video data for transmission can be individually generated by setting of a user. For example, the video data output from video input controller 108 can be set as the video data for display, and the video data synthesized by video and voice synthesizer 105 can be set as the video data for transmission.

Exemplary Embodiment 4

Configuration and Connection Relationship of Videoconference Device

First, configurations and connection relationships of videoconference devices 10 according to Exemplary Embodiment 4 of the present disclosure will be described in detail with reference to FIG. 1.

The respective sites are respectively provided with videoconference devices 10. Videoconference device 10-1 of a host site (site number 1) is connected to the respective videoconference devices 10-2 to 10-24 installed in each of the other sites (site numbers 2 to 24) through network 20, and performs transmission/reception of the voice data and the video data. Network 20 is typically the Internet.

Videoconference device 10-1 is configured with main body device 100, user operation input device 200, video input device 300, voice input device 400, and a display device 500.

Main body device 100 is connected to user operation input device 200, video input device 300, voice input device 400, and display device 500.

User operation input device 200 detects an operation of selecting a site which is performed by a user, and transmits a signal including selected site information indicating the selected site to main body device 100 in a wire or wireless manner. User operation input device 200 is typically a remote controller or a touch panel.

Video input device 300 outputs the video data obtained by capturing video of the site where main body device 100 is installed to main body device 100. In addition to the video data captured by a camera, the video data output from video input device 300 includes video data stored in a PC, video data reproduced by a DVD player, and the like.

Voice input device 400 outputs the voice data and the like obtained by collecting voices of the site where main body device 100 is installed to main body device 100. In addition to the voice data collected by a microphone, the voice data output from voice input device 400 includes the voice data which is a set with the video data stored in a PC, the voice data which is a set with the video data reproduced by a DVD player, and the like.

Display device 500 displays the video data output from main body device 100 on a screen, and outputs the voice data output from main body device 100, from a speaker which is not illustrated.

Main body device 100 is mainly configured with user instruction receiver 101, conference controller 102, communication controller 103, video and voice encoding/decoding unit 104, video and voice synthesizer 105, video and voice output controller 106, still image holder 107, video input controller 108, and voice input controller 109. A display controller is configured by video and voice encoding/decoding unit 104, video and voice synthesizer 105, and video and voice output controller 106.

User instruction receiver 101 receives a signal transmitted from user operation input device 200, extracts the selected site information included in the received signal, and outputs the extracted information to conference controller 102. The selected site information includes signal transmission destination information (IP address or ISDN number) of each site which participates in a video conference.

Conference controller 102 controls timing of data which is input to and output from communication controller 103, video and voice encoding/decoding unit 104, and video and voice synthesizer 105, based on the selected site information input from user instruction receiver 101. In addition, conference controller 102 outputs the selected site information input from user instruction receiver 101 to video and voice synthesizer 105. In addition, conference controller 102 controls signal transmission processing and call establishment processing of communication controller 103, and monitors whether or not video data is received, based on the selected site information.

Communication controller 103 operates at timing according to control of conference controller 102. Communication controller 103 establishes a call with the other videoconference devices 10-2 to 10-24. After establishing the call, communication controller 103 receives a packet including the video data and the voice data transmitted from the other videoconference devices 10-2 to 10-24 through network 20, and outputs the received packet to video and voice encoding/decoding unit 104. In addition, after establishing the call, communication controller 103 transmits a packet including the video data and the voice data input from video and voice encoding/decoding unit 104 to the other videoconference devices 10-2 to 10-24 through network 20. Communication controller 103 operates in accordance with a predetermined communication protocol. The communication protocol is typically SIP or H.323.

In addition, communication controller 103 performs grouping of the other videoconference devices 10-2 to 10-24, based on network information managed by video and voice encoding/decoding unit 104. For example, communication controller 103 determines a site with round-trip time (RTT) less than or equal to a threshold as a broadband site (HD resolution transmission group), and determines a site with RTT more than the threshold as a narrowband site (SD resolution transmission group).

Video and voice encoding/decoding unit 104 operates at timing according to the control of conference controller 102. Video and voice encoding/decoding unit 104 encodes the video data input from video and voice synthesizer 105 and the voice data input from voice input controller 109, and outputs the encoded data to communication controller 103.

Encoding the video data is performed based on video encoding parameters. Video and voice encoding/decoding unit 104 determines video encoding parameters affecting a subjective evaluation of video quality, for each group. The video encoding parameters include an encoding bit rate, an encoding frame rate, an encoding resolution, a packet size, a low pass filter, and the like. For example, video and voice encoding/decoding unit 104 sets encoding parameters such that each site belonging to the HD resolution transmission group has a screen resolution of 1920×1080 pixels, and sets the video encoding parameters such that each site belonging to the SD resolution transmission group has the screen resolution of 720×480 pixels.

In addition, video and voice encoding/decoding unit 104 decodes the video data and the voice data which are output from the other videoconference devices 10-2 to 10-24 and are input from communication controller 103, and outputs the decoded data to video and voice synthesizer 105.

In addition, video and voice encoding/decoding unit 104 manages network information of the other videoconference devices 10-2 to 10-24. The network information includes types of devices at each child site (whether it is a mobile terminal or not), a packet loss frequency (the number of times of packet loss within a predetermined time), an IP address, an RTT, an estimated bandwidth, and the like.

Video and voice synthesizer 105 operates at timing according to the control of conference controller 102. Video and voice synthesizer 105 generates the synthesized video data by synthesizing a plurality of pieces of video data in accordance with the number of sites of the selected site information input from conference controller 102, based on the video data from the other videoconference devices 10-2 to 10-24 which is input from video and voice encoding/decoding unit 104 and the video data input from video input controller 108, and outputs the synthesized video data to video and voice output controller 106. Video and voice synthesizer 105 generates the synthesized video data such that a still image held in still image holder 107 is displayed until the video data from each of videoconference devices 10-2 to 10-24 is received.

In addition, video and voice synthesizer 105 generates the synthesized voice data by synthesizing the voice data from the other videoconference devices 10-2 to 10-24 input from video and voice encoding/decoding unit 104 and the voice data input from voice input controller 109, and outputs the synthesized voice data to video and voice output controller 106. In addition, video and voice synthesizer 105 outputs the video data input from video input controller 108 to video and voice encoding/decoding unit 104.

Video and voice output controller 106 displays the synthesized video data input from video and voice synthesizer 105 on the screen of display device 500 and outputs the synthesized voice data from the speaker of display device 500 as a voice.

Still image holder 107 holds still image data for displaying a predetermined still image on the screen of display device 500 in advance, during a period in which the video data from the other videoconference devices 10-2 to 10-24 is received.

Video input controller 108 outputs the video data input from video input device 300 to video and voice synthesizer 105.

Voice input controller 109 outputs the voice data input from voice input device 400 to video and voice encoding/decoding unit 104 and video and voice synthesizer 105.

Transition of Connection State of Videoconference Device

Next, transition of a connection state of videoconference device 10-1 will be described in detail with reference to FIG. 2.

Videoconference device 10-1 starts an operation by turning the power on. Videoconference device 10-1 is in a non-communication state shortly after the power is turned on (S1).

Videoconference device 10-1 is connected to another videoconference device 10-*i* (i is any one of integers from 2 to 24), in the non-communication state (S1), thereby, being in a one-to-one communication state (1:1 communication state) with videoconference device 10-*i* (S2). If the connection with videoconference device 10-*i* in a communication state is cut in the 1:1 communication state (S2), videoconference device 10-1 enters the non-communication state (S1). Videoconference device 10-1 ends the operation by turning the power off in the non-communication state (S1).

In addition, videoconference device 10-1 is connected to still another videoconference device 10-*j* 0 is any one of integers from 2 to 24 except for i) from the 1:1 communication state (S2), thereby entering a communication state (MCU communication state) with videoconference devices 10-*i* and 10-*j* at a plurality of sites (S3).

If the connection with videoconference device 10-*j* in a communication state is cut, videoconference device 10-1 enters the one-to-one communication state (S2), and furthermore, if the connection with videoconference device 10-*i* in a communication state is cut, videoconference device 10-1 enters the non-communication state (S1).

In addition, videoconference device 10-1 performs simultaneous signal transmission to all the other videoconference devices 10-2 to 10-24 in the non-communication state (S1), thereby, entering the communication state (MCU communication state) with all the other videoconference devices 10-2 to 10-24 (S3). If the connection with all the other videoconference devices 10-2 to 10-24 are simultaneously cut, videoconference devices 10 enter the non-communication state (S1).

A method of causing a user to manually input a signal transmission destination to videoconference device 10-1 at the time of signal transmission, a method of causing a user to select a list in which a plurality of pieces of signal transmission destination information stored in videoconference device 10-1 in advance are registered, or the like is considered as a method of performing the simultaneous signal transmission. In addition, an IP address, a telephone number, an identification code, or the like is considered as a method of specifying the signal transmission destination.

Operation of Videoconference Device

Figure 9:
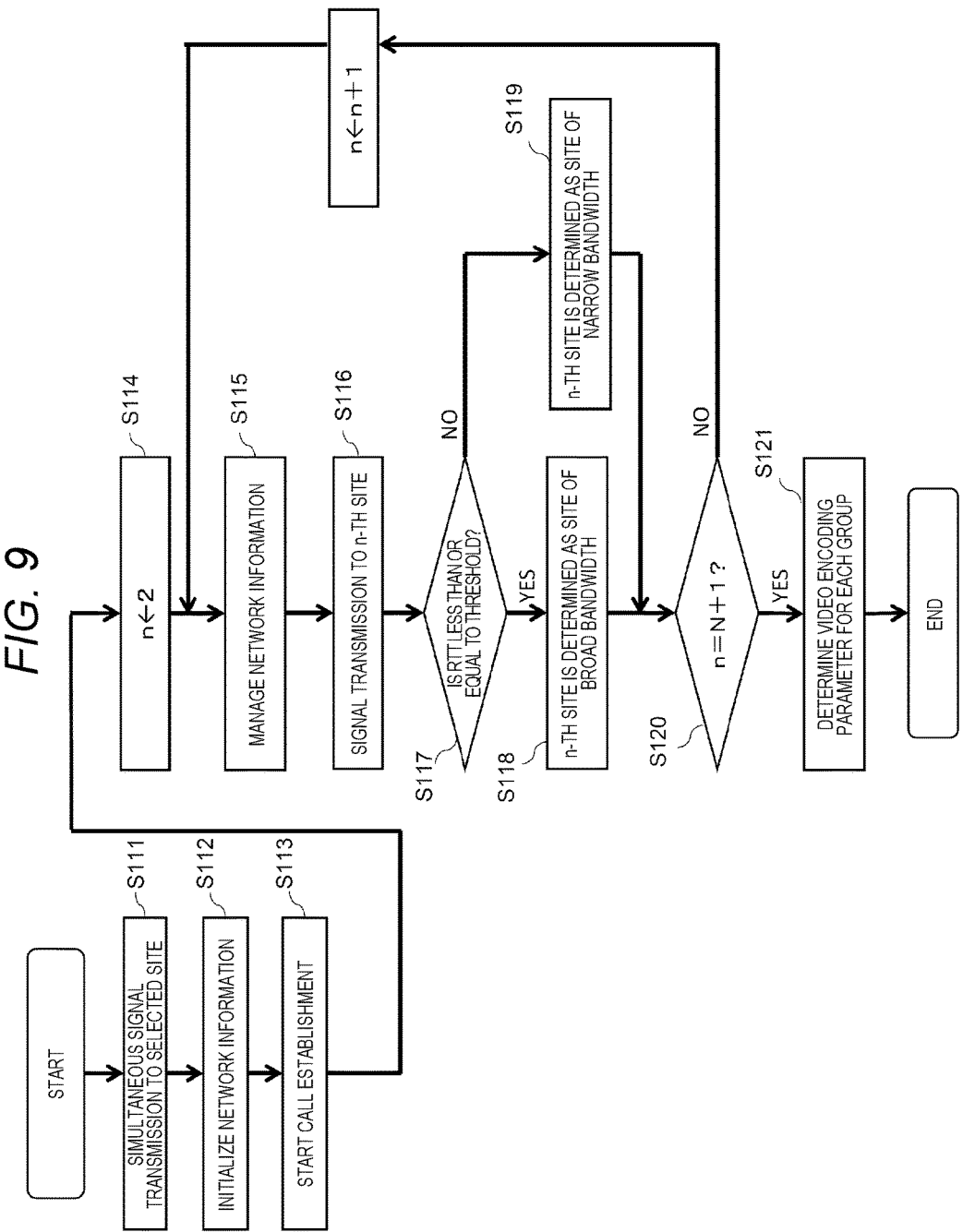
FIG. 9 is a flowchart illustrating an operation of a videoconference device according to Exemplary Embodiment 4 of the present disclosure.

Next, an operation of videoconference device 10-1 will be described in detail with reference to FIG. 9. FIG. 9 is a flow in a case where videoconference device 10-1 performs simultaneous signal transmission to all the other videoconference devices 10-2 to 10-24.

First, user instruction receiver 101 receives a signal from user operation input device 200, extracts selected site information included in the received signal, and outputs the selected site information to conference controller 102.

Conference controller 102 controls communication controller 103 so as to perform simultaneous signal transmission to videoconference devices 10-2 to 10-24 installed at each of N (N is an integer of 1 or more, N=23 in FIG. 9) sites of the selected site information. Thereby, communication controller 103 performs simultaneous signal transmission to videoconference devices 10-2 to 10-24 at the selected sites (S111). Specifically, in a case where the selected site information is information of one list in which a plurality of pieces of signal transmission destination information are recorded, conference controller 102 can recognize the number of sites N, based on the number of signal transmission destinations of the signal transmission destination information registered in the list.

In addition, video and voice encoding/decoding unit 104 initializes network information (types of devices at each child site, packet loss frequency, IP address, RTT, estimated bandwidth, and the like) (S112).

In addition, communication controller 103 establishes a call with each of videoconference devices 10-2 to 10-24 at the other sites (S113).

Thereafter, videoconference device 10-1 performs grouping for an n-th site (n is any one of integers from 2 to N+1) sequentially from the site of a site number 2 (S114 to S120). Specifically, video and voice encoding/decoding unit 104 decodes the packet data received from each child site, and performs management (setting, updating) of the network information based on the decoded result (S115), and, if the RTT of the signal transmitted to the n-th site is less than or equal to a threshold, communication controller 103 determines that it is a site of a broad bandwidth (S116, S117: YES, S118) and if the RTT is more than the threshold, communication controller 103 determines that it is a site of a narrow bandwidth (S116, S117: NO, S119).

After the grouping is completed (S120: YES), video and voice encoding/decoding unit 104 determines video encoding parameters for each group (S121).

Exemplary Embodiment 5

Figure 10:
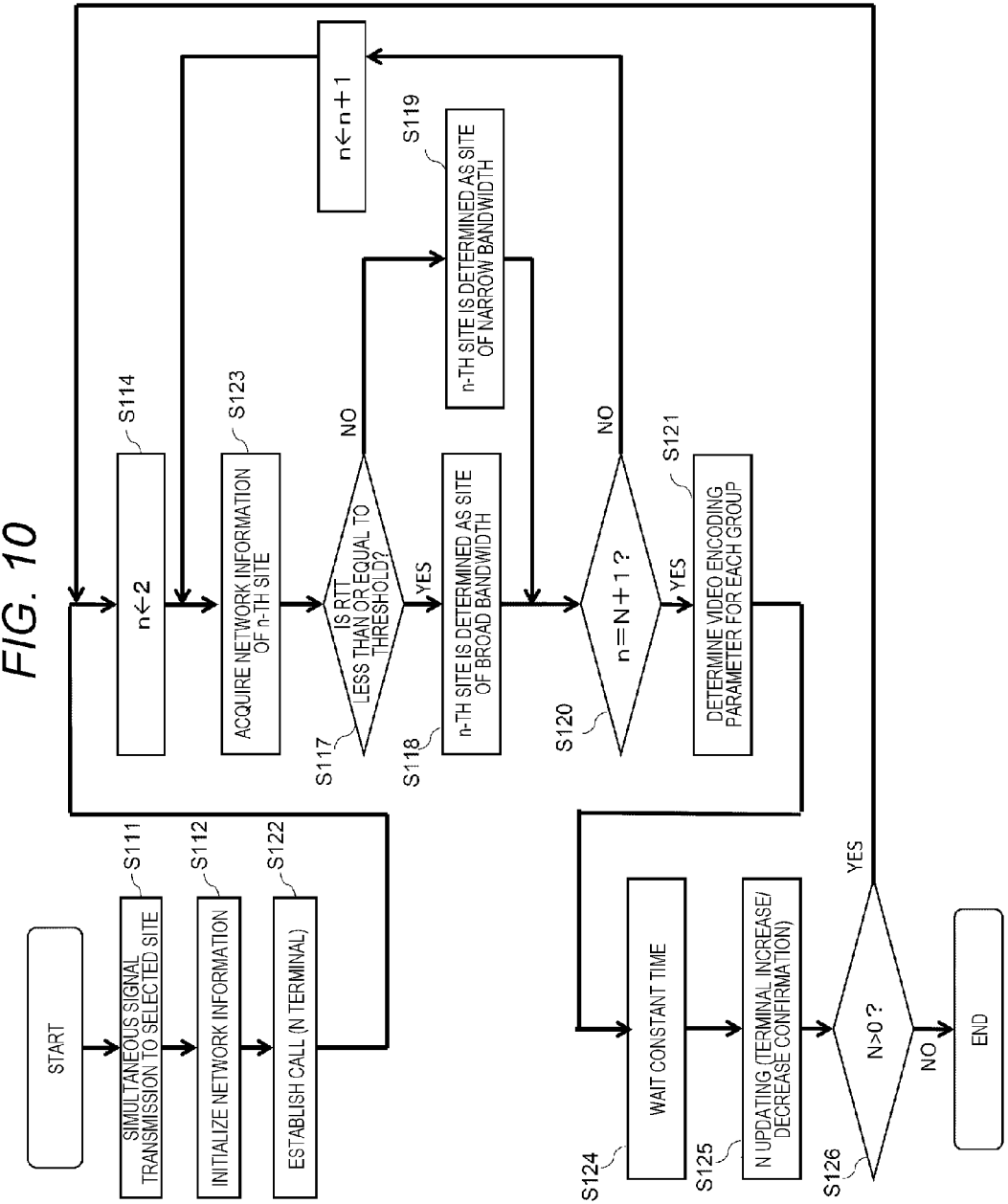
FIG. 10 is a flowchart illustrating an operation of the videoconference device according to Exemplary Embodiment 5 of the present disclosure.

Next, Exemplary Embodiment 5 of an operation of videoconference device 10-1 will be described in detail with reference to FIG. 10. FIG. 10 is an operation example for maintaining and improving accuracy of grouping during communication. The same step numbers as in FIG. 9 are attached to the same processing as in FIG. 9, and description thereof will be omitted.

In FIG. 10, communication controller 103 establishes a call with the N sites after S112 (S122). After step S114, videoconference device 10-1 acquires network information of the n-th site (S123). After S121 of FIG. 9, processing stands by for a constant time (S124), and a value of N is updated (S125). The value of N is the number of the other videoconference devices connected to videoconference device 10-1. It is determined whether or not the value of N is larger than 0 (1 or more) (S126). If the value of N is larger than 0, at least one of the other videoconference devices connected to videoconference device 10-1 exists (S126: YES), and thereby, the processing returns to S114, and meanwhile, if the value of N is 0, the other videoconference devices connected to videoconference device 10-1 do not exist (S126: NO), the processing ends.

Particularly, in a case where a child site is a mobile terminal or the like, a network bandwidth changes depending on a place or time, and thereby, even if proper grouping is performed based on the RTT value at the communication start as illustrated in FIG. 9, thereafter, the grouping may be inappropriate.

In contrast to this, in FIG. 10, the RTT value is periodically detected at each site during communication (S126: YES), and whether the bandwidth is a broad bandwidth or a narrow bandwidth is determined again based on the detected RTT value (S117, S118, and S119). Thereby, even if the child site is a mobile terminal or the like in which the network bandwidth changes depending on a place and time, accuracy of the grouping can be maintained and improved, and as a result, it is possible to determine appropriate video encoding parameters (S121).

Effect

As such, according to the present exemplary embodiment, grouping can be performed based on network information correlated with an actual network bandwidth, and it is possible to perform grouping with high accuracy, with respect to a site in which a mediation bandwidth preset for each child site and an actual network bandwidth are different from each other.

In the present disclosure, types, arrangement, the number, and the like of members are not limited to the aforementioned embodiments, and the present disclosure may be appropriately modified in a range without departing from the gist of the disclosure, such as appropriately replacing the configuration elements with configuration elements having the same action effects.

Specifically, in the aforementioned exemplary embodiment, a case where grouping is performed based on a magnitude relationship between the RTT and a threshold is described, but the present disclosure is not limited to this, and the grouping may be performed based on other network information. For example, a site in which a frequency of packet loss is less than or equal to a threshold may be determined as a site of a broad bandwidth, and a site in which the frequency of packet loss is larger than the threshold may be determined as a site of a narrow bandwidth. Alternatively, a site existing in the country may be determined as the site of a broad bandwidth and a site existing in overseas may be determined as the site of a narrow bandwidth, based on information capable of estimating a place of another site such as an IP address. Alternatively, a site other than a mobile terminal may be determined as the site of a broad bandwidth, and a site of the mobile terminal may be determined as the site of a narrow bandwidth, based on information indicating types of the devices at each child site.

In addition, in the aforementioned embodiment, a case where a still image is displayed until video is displayed is described, but the present disclosure is not limited to this, and character information such as a message other than the still image may be displayed, or a black screen may be displayed as it is.

In addition, in the aforementioned embodiment, a videoconference system in which the number of sites that can be simultaneously connected is 24 is described as an example, but the present disclosure is not limited to the number of sites that can be simultaneously connected.

In addition, in the present disclosure, the video data for display and the video data for transmission can be individually generated by setting of a user. For example, the video data output from video input controller 108 can be set as the video data for display, and the video data synthesized by video and voice synthesizer 105 can be set as the video data for transmission.

Exemplary Embodiment 6

Configuration and Connection Relationship of Videoconference Device

First, configurations and connection relationships of videoconference devices 10 according to Exemplary Embodiment 6 of the present disclosure will be described in detail with reference to FIG. 1.

The respective sites are respectively provided with videoconference devices 10. Videoconference device 10-1 of a host site (site number 1) is connected to the respective videoconference devices 10-2 to 10-24 installed in each of the other sites (site numbers 2 to 24) through network 20, and performs transmission/reception of the voice data and the video data. Network 20 is typically the Internet.

Videoconference device 10-1 is configured with main body device 100, user operation input device 200, video input device 300, voice input device 400, and a display device 500.

Main body device 100 is connected to user operation input device 200, video input device 300, voice input device 400, and display device 500.

User operation input device 200 detects an operation of selecting a site which is performed by a user, and transmits a signal including selected site information indicating the selected site to main body device 100 in a wire or wireless manner. User operation input device 200 is typically a remote controller or a touch panel.

Video input device 300 outputs the video data obtained by capturing video of the site where main body device 100 is installed to main body device 100. In addition to the video data captured by a camera, the video data output from video input device 300 includes video data stored in a PC, video data reproduced by a DVD player, and the like.

Voice input device 400 outputs the voice data and the like obtained by picking up voices of the site where main body device 100 is installed to main body device 100. In addition to the voice data picked up by a microphone, the voice data output from voice input device 400 includes the voice data which is a set with the video data stored in a PC, the voice data which is a set with the video data reproduced by a DVD player, and the like.

Display device 500 displays the video data output from main body device 100 on a screen, and outputs the voice data output from main body device 100, from a speaker which is not illustrated.

Main body device 100 is mainly configured with user instruction receiver 101, conference controller 102, communication controller 103, video and voice encoding/decoding unit 104, video and voice synthesizer 105, video and voice output controller 106, still image holder 107, video input controller 108, and voice input controller 109. A display controller is configured by video and voice encoding/decoding unit 104, video and voice synthesizer 105, and video and voice output controller 106.

User instruction receiver 101 receives a signal transmitted from user operation input device 200, extracts the selected site information included in the received signal, and outputs the extracted information to conference controller 102. The selected site information includes signal transmission destination information (IP address or ISDN number) of each site which participates in a video conference.

Conference controller 102 controls timing of data which is input to and output from communication controller 103, video and voice encoding/decoding unit 104, and video and voice synthesizer 105, based on the selected site information input from user instruction receiver 101. In addition, conference controller 102 outputs the selected site information input from user instruction receiver 101 to video and voice synthesizer 105. In addition, conference controller 102 controls signal transmission processing and call establishment processing of communication controller 103, and monitors whether or not video data is received, based on the selected site information.

Communication controller 103 operates at timing according to control of conference controller 102. Communication controller 103 establishes a call with the other videoconference devices 10-2 to 10-24. After establishing the call, communication controller 103 receives a packet including the video data (p picture, IDR picture) and the voice data transmitted from the other videoconference devices 10-2 to 10-24 through network 20, and outputs the received packet to video and voice encoding/decoding unit 104. In addition, after establishing the call, communication controller 103 transmits a packet including the video data and the voice data input from video and voice encoding/decoding unit 104 to the other videoconference devices 10-2 to 10-24 through network 20. Communication controller 103 operates in accordance with a predetermined communication protocol. The communication protocol is typically SIP or H.323.

In addition, the communication controller 103 transmits FIR in accordance with an instruction of video and voice encoding/decoding unit 104.

Video and voice encoding/decoding unit 104 operates at the timing according to the control of conference controller 102. Video and voice encoding/decoding unit 104 encodes the video data input from video and voice synthesizer 105 and the voice data input from voice input controller 109, and outputs the encoded data to communication controller 103. In addition, video and voice encoding/decoding unit 104 decodes the video data and the voice data which are output from the other videoconference devices 10-2 to 10-24 and are input from communication controller 103, and outputs the decoded data to video and voice synthesizer 105.

In addition, video and voice encoding/decoding unit 104 manages network information of the other videoconference devices 10-2 to 10-24, and in a case where packet loss occurs (in a case where the packet is lost), video and voice encoding/decoding unit 104 determines whether to transmit the FIR or not, and determines whether to display a still image, based on the network information. Video and voice encoding/decoding unit 104 instructs communication controller 103 to transmit the FIR, and instructs video and voice synthesizer 105 to display the still image.

The network information includes types of devices at each child site (whether it is a mobile terminal or not), a packet loss frequency (the number of times of packet loss within a predetermined time), an IP address, round-trip time (RTT), an estimated bandwidth, and the like.

Video and voice synthesizer 105 operates at the timing according to the control of conference controller 102. Video and voice synthesizer 105 generates the synthesized video data by synthesizing a plurality of pieces of video data in accordance with the number of sites of the selected site information input from conference controller 102, based on the video data which is output from the other videoconference devices 10-2 to 10-24 and are input from video and voice encoding/decoding unit 104 and the video data input from video input controller 108, and outputs the synthesized video data to video and voice output controller 106. Video and voice synthesizer 105 generates the synthesized voice data such that the still image is displayed, while receiving the video data from each of videoconference devices 10-2 to 10-24 and during a period instructed from video and voice encoding/decoding unit 104.

In addition, video and voice synthesizer 105 generates the synthesized voice data by synthesizing the voice data which is output from the other videoconference devices 10-2 to 10-24 and is input from video and voice encoding/decoding unit 104 and the voice data input from voice input controller 109, and outputs the synthesized voice data to video and voice output controller 106. In addition, video and voice synthesizer 105 outputs the video data input from video input controller 108 to video and voice encoding/decoding unit 104.

Video and voice output controller 106 displays the synthesized video data input from video and voice synthesizer 105 on the screen of display device 500 and outputs the synthesized voice data from the speaker of display device 500 as a voice.

Still image holder 107 holds still image data for displaying a predetermined still image on a screen of display device 500 in advance during a period in which the video data is received from the other videoconference devices 10-2 to 10-24.

Video input controller 108 outputs the video data input from video input device 300 to video and voice synthesizer 105.

Voice input controller 109 outputs the voice data input from voice input device 400 to video and voice encoding/decoding unit 104 and video and voice synthesizer 105.

Transition of Connection State of Videoconference Device

Next, transition of a connection state of videoconference device 10-1 will be described in detail with reference to FIG. 2.

Videoconference device 10-1 starts an operation by turning the power on. Videoconference device 10-1 is in a non-communication state shortly after the power is turned on (S1).

Videoconference device 10-1 is connected to another videoconference device 10-*i* (i is any one of integers from 2 to 24) in the non-communication state (S1), thereby, being in a one-to-one communication state (1:1 communication state) with the videoconference device 10-*i* (S2). If the connection with videoconference device 10-*i* in a communication state is cut in the 1:1 communication state (S2), videoconference device 10-1 enters the non-communication state (S1). Videoconference device 10-1 ends an operation by turning the power off in the non-communication state (S1).

In addition, videoconference device 10-1 is connected to still another videoconference device 10-*j* (j is any one of integers from 2 to 24 except for i) from the 1:1 communication state (S2), thereby entering a communication state (MCU communication state) with videoconference devices 10-*i* and 10-*j* at a plurality of sites (S3).

If the connection with videoconference device 10-*j* in a communication state is cut, videoconference device 10-1 enters the one-to-one communication state (S2), and furthermore, if the connection with videoconference device 10-*i* in a communication state is cut, videoconference device 10-1 enters the non-communication state (S1).

In addition, videoconference device 10-1 performs simultaneous signal transmission to all the other videoconference devices 10-2 to 10-24 in the non-communication state (S1), thereby, entering the communication state (MCU communication state) with all the other videoconference devices 10-2 to 10-24 (S3). If the connections with all the other videoconference devices 10-2 to 10-24 are simultaneously cut, videoconference devices 10 enter the non-communication state (S1).

A method of causing a user to manually input a signal transmission destination to videoconference device 10-1 at the time of signal transmission, a method of causing a user to select a list in which a plurality of pieces of signal transmission destination information stored in videoconference device 10-1 in advance are registered, or the like is considered as a method of performing the simultaneous signal transmission. In addition, an IP address, a telephone number, an identification code, or the like is considered as a method of specifying the signal transmission destination.

Operation of Videoconference Device

Figure 11:
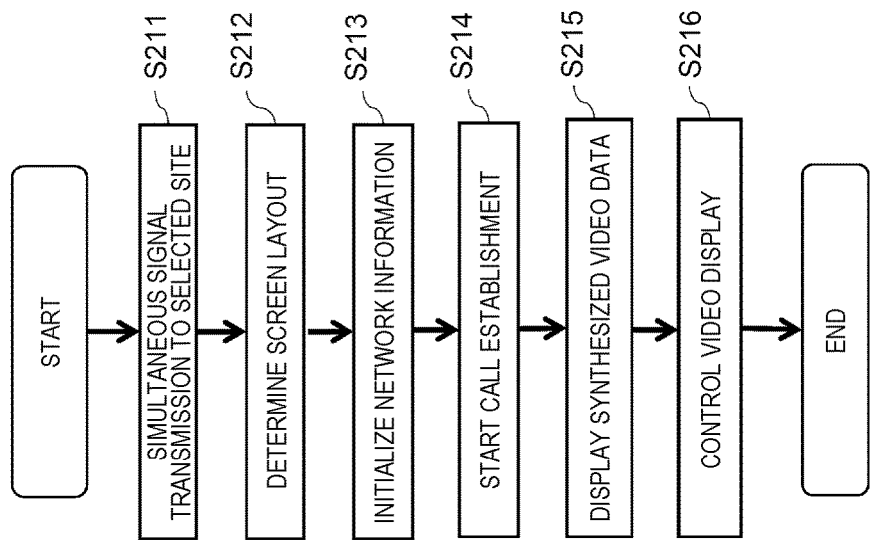
FIG. 11 is a flowchart illustrating an operation of the videoconference device according to Exemplary Embodiment 6 of the present disclosure.

Next, an operation of videoconference device 10-1 will be described in detail with reference to FIG. 11. FIG. 11 is a flow in a case where videoconference device 10-1 performs the simultaneous signal transmission to all the other videoconference devices 10-2 to 10-24.

First, user instruction receiver 101 receives a signal from user operation input device 200, extracts the selected site information included in the received signal, and outputs the selected site information to conference controller 102.

Conference controller 102 controls communication controller 103 such that the simultaneous signal transmission to videoconference devices 10-2 to 10-24 installed at each of N (N is an integer of 1 or more, N=23 in FIG. 11) sites of the selected site information is performed. Thereby, communication controller 103 performs the simultaneous signal transmission to videoconference devices 10-2 to 10-24 at the selected sites (S211). Specifically, in a case where the selected site information is information of one list in which a plurality of pieces of signal transmission destination information is recorded, conference controller 102 can recognize site number N based on the number of signal transmission destinations of the signal transmission destination information registered in the list.

In addition, video and voice synthesizer 105 determines a screen layout, based on the selected site information input from conference controller 102 (S212).

In addition, video and voice encoding/decoding unit 104 initializes network information (types of devices at each child site, packet loss frequency, IP address, RTT, estimated bandwidth, and the like) (S213).

In addition, communication controller 103 establishes a call with each of videoconference devices 10-2 to 10-24 at the other sites (S214).

Next, video and voice synthesizer 105 generates the synthesized video data such that the video data of videoconference device 10-1 input from video input controller 108 and the video data of the other videoconference devices 10-2 to 10-24 are respectively displayed in corresponding divided regions of a screen layout. Video and voice output controller 106 displays the synthesized video data input from video and voice synthesizer 105 on the screen of display device 500 (S215) (refer to FIG. 13A). Until the video data is received from the other videoconference devices 10-2 to 10-24, still image data is displayed in the corresponding divided regions.

Thereafter, videoconference device 10-1 performs a video display control operation (S216) while bidirectional communication is continued.

Figure 12:
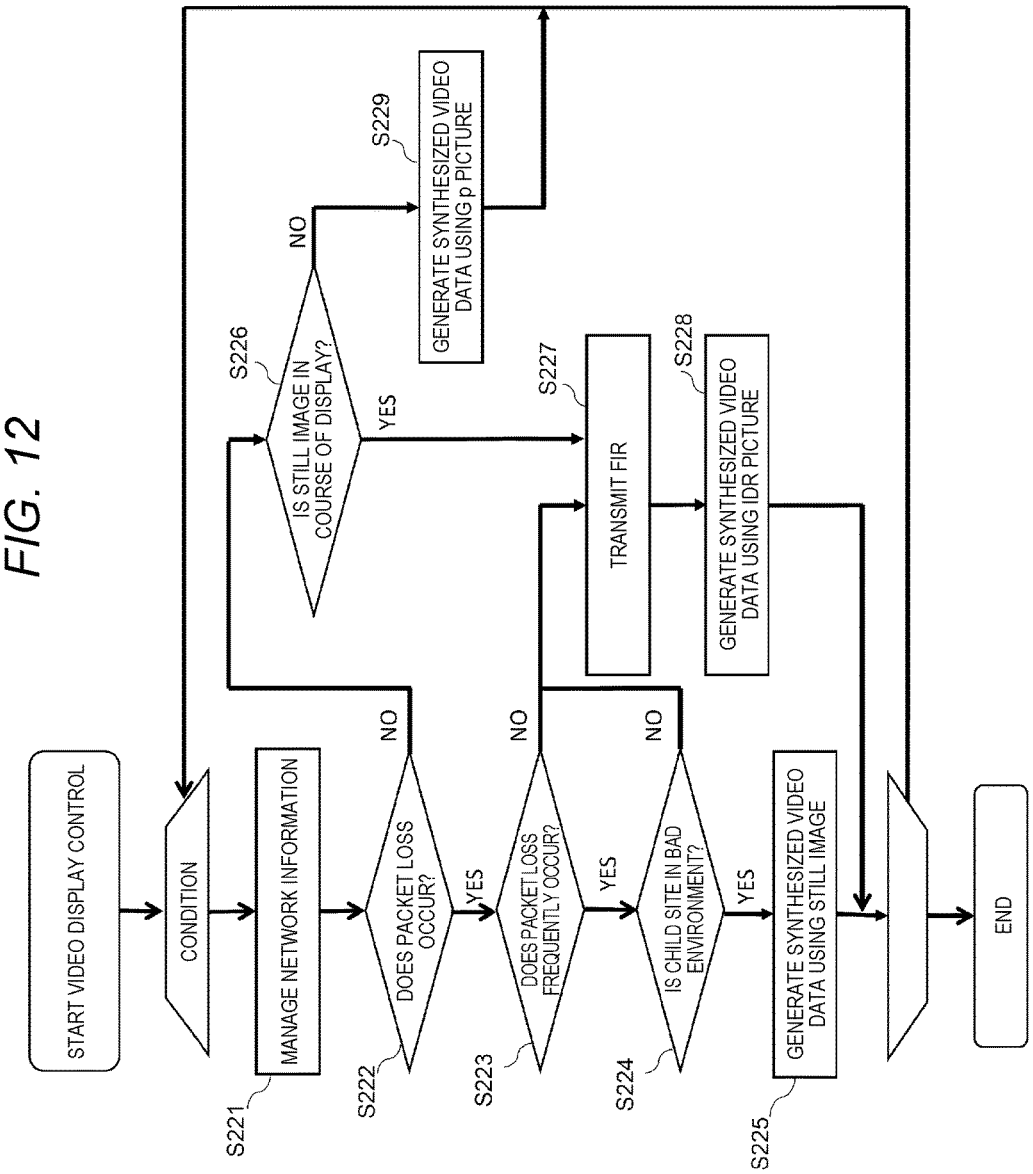
FIG. 12 is a flowchart illustrating a video display control operation of the videoconference device according to Exemplary Embodiment 6 of the present disclosure.

Hereinafter, the video display control operation (S216) of videoconference device 10-1 according to the present exemplary embodiment will be described in detail with reference to FIG. 12.

First, video and voice encoding/decoding unit 104 decodes the packet data received from each child site (each of other videoconference devices 10-2 to 10-24), performs management (setting, updating) of the network information based on the decoded result (S221), and determines whether or not packet loss occurs (S222).

In a case where the packet loss occurs (S222: YES), video and voice encoding/decoding unit 104 determines whether or not the packet loss frequently occurs at the child site point (packet loss frequency is more than or equal to a predetermined threshold) (S223).

In a case where the packet loss frequently occurs (S223: YES), video and voice encoding/decoding unit 104 determines whether or not the child site is in a bad environment based on the network information (S224). The child site in a bad environment indicates a case where the child site is a mobile terminal, a case where the child site exists in overseas, or the like. Videoconference device 10-1 can determine whether or not each child site is a mobile terminal, based on User Agent information. In addition, videoconference device 10-1 can determine whether or not each child site exists in overseas, based on RTT or an IP address.

In a case where the child site is in a bad environment (S224: YES), video and voice encoding/decoding unit 104 does not instruct communication controller 103 to transmit the FIR, but instructs video and voice synthesizer 105 to generate the synthesized video data using a still image. Video and voice synthesizer 105 generates the synthesized video data such that a display region of the child site becomes still image data. Video and voice output controller 106 displays the synthesized video data input from video and voice synthesizer 105 on the screen of display device 500 (S225). Thereafter, the flow returns to S221.

Meanwhile, even in a case where a packet loss occurs (S222: YES), in a case where the packet loss does not frequently occur (S223: NO), or in a case where the child site is not in a bad environment (S224: NO), video and voice encoding/decoding unit 104 instructs communication controller 103 to perform FIR transmission. Communication controller 103 transmits the FIR to the child site, based on the instruction (S226). The child site received the FIR transmits a packet in which an IDR picture is inserted to a parent site.

Video and voice encoding/decoding unit 104 decodes the IDR picture and outputs the decoded IDR picture to video and voice synthesizer 105. Video and voice synthesizer 105 generates synthesized video data such that a display region of the child site becomes video data of the IDR picture. Video and voice output controller 106 displays the synthesized video data input from video and voice synthesizer 105 on the screen of the display device 500 (S228). Thereafter, the flow returns to S221.

In addition, in a case where the packet loss does not occur and the packet can be normally received (S222: NO), if there is a child site displaying the still image data in S225 (S226: YES), communication controller 103 transmits the FIR to the child site (S227), video and voice encoding/decoding unit 104, video and voice synthesizer 105, and video and voice output controller 106 generate the synthesized video data using the IDR picture to be displayed (S228). Thereafter, the flow returns to S221.

In addition, with respect to the other child sites that can normally receive the packet (S222: NO, S226: NO), video and voice encoding/decoding unit 104, video and voice synthesizer 105, and video and voice output controller 106 generates the synthesized video data using a p picture to be displayed (S229). Thereafter, the flow returns to S221.

Specific Example of Display Screen

Figure 13:
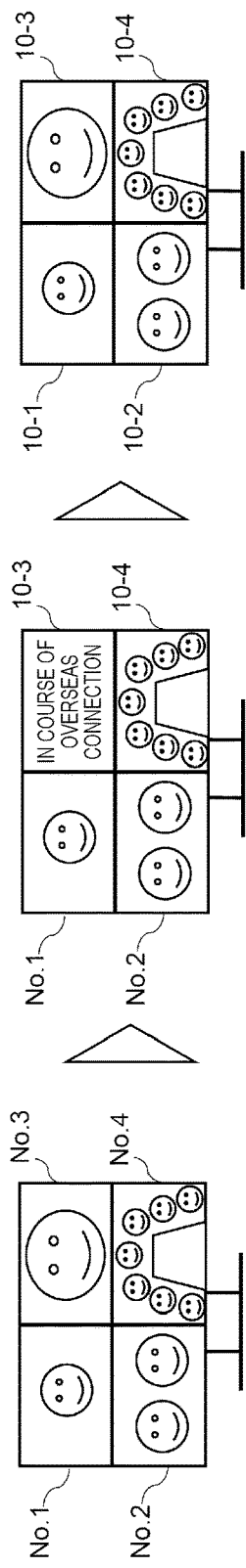
FIGS. 13A to 13C are diagrams illustrating an example of display screen of the videoconference device according to Exemplary Embodiment 6 of the present disclosure.

Next, a specific example of a screen on which the synthesized video data is displayed will be described in detail with reference to FIG. 13. FIG. 13, illustrates an example in which the video data of four sites (site numbers 1, 2, 3, and 4) are simultaneously displayed so as to make it easy to understand disclosure contents.

FIG. 13A illustrates an example of a case where a network between all child sites is normal and no packet loss occurs. In this case, video and voice synthesizer 105 generates the synthesized vide data by synthesizing the video data of a new site (master device, site number 1) input from video input controller 108 and the video data from the child sites (site numbers 2, 3, and 4) input from video and voice encoding/decoding unit 104.

Thereafter, it is assumed that abnormality occurs in the network with the child site (site number 3) in overseas and the packet loss frequently occurs. In this case, video and voice encoding/decoding unit 104 instructs video and voice synthesizer 105 to generate synthesized video data using a still image. As illustrated in FIG. 13B, video and voice synthesizer 105 generates the synthesized video data for displaying a still image (characters such as "in course of overseas connection") in a display region of the child site of the site number 3.

Thereafter, it is assumed that the network with the child site (site number 3) in overseas is recovered and the packet loss no longer occurs. In this case, communication controller 103 transmits a FIR to the child site of the site number 3, and video and voice encoding/decoding unit 104 decodes the video data of the child site of the site number 3 using an IDR picture. As illustrated in FIG. 13C, video and voice synthesizer 105 generates the synthesized video data again by synthesizing the video data of the master site (site number 1) input from video input controller 108 and the video data from the child sites (site numbers 2, 3, and 4) input from video and voice encoding/decoding unit 104.

Effect

As such, in the present exemplary embodiment, in a case where abnormality occurs in a network with a child site in a bad environment and packet loss frequently occurs, a parent site does not perform FIR transmission, and thus, it is possible to suppress transmission of an unnecessary IDR picture and to reduce a load of the entire network.

In the present disclosure, types, arrangement, the number, and the like of members are not limited to the aforementioned embodiments, and the present disclosure may be appropriately modified in a range without departing from the gist of the disclosure, such as appropriately replacing the configuration elements with configuration elements having the same action effects.

Specifically, in the aforementioned exemplary embodiment, a case where a still image is displayed until video is displayed is described, but the present disclosure is not limited to this, and character information such as a message other than the still image may be displayed, or a black screen may be displayed as it is.

In addition, in the aforementioned embodiment, a videoconference system in which the number of sites that can be simultaneously connected is 24 is described as an example, but the present disclosure is not limited to the number of sites that can be simultaneously connected.

In addition, in the present disclosure, the video data for display and the video data for transmission can be individually generated by setting of a user. For example, the video data output from video input controller 108 can be set as the video data for display, and the video data synthesized by video and voice synthesizer 105 can be set as the video data for transmission.

Exemplary Embodiment 7

In Exemplary Embodiment 7, a case where a speech site with a first priority in which a participant, who is mainly speaking, is displayed and an audience site with second priority lower than the first priority, in which a participant, who is listening without speaking, is displayed are fixed will be described.

Configuration and Connection Relationship of Videoconference Device

First, configurations and connection relationships of videoconference devices 10 according to Exemplary Embodiment 7 of the present disclosure will be described in detail with reference to FIG. 1.

Videoconference devices 10 are respectively installed at each site. Videoconference device 10-1 at the host site (multisite connection device (MCU), site number 1) is connected to each of videoconference devices 10-2 to 10-24 which are respectively installed at the other sites (site numbers 2 to 24) through network 20, and transmits/receives voice data and video data. Network 20 is typically the Internet.

Videoconference device 10-1 is configured with main body device 100, user operation input device 200, video input device 300, voice input device 400, and display device 500.

Main body device 100 is connected to user operation input device 200, video input device 300, voice input device 400, and display device 500.

User operation input device 200 detects an operation for selecting a site which is performed by a user, and transmits a signal including selected site information indicating the selected site to main body device 100 in a wire or wireless manner. User operation input device 200 is typically a remote controller or a touch panel.

Video input device 300 outputs video data obtained by capturing an image of a site where main body device 100 is installed to main body device 100. In addition to the video data captured by a camera, the video data output from video input device 300 includes video data stored in a PC, video data reproduced by a DVD player, and the like.

Voice input device 400 outputs voice data and the like obtained by picking up voices of the site where main body device 100 is installed to main body device 100. In addition to voice data picked up by a microphone, the voice data output from voice input device 400 includes voice data which is a set with the video data stored in the PC, voice data which is a set with the video data reproduced by the DVD player, and the like.

Display device 500 displays the video data output from main body device 100 on a screen, and outputs the voice data output from main body device 100, from a speaker which is not illustrated.

Main body device 100 is mainly configured with user instruction receiver 101, conference controller 102, communication controller 103, video and voice encoding/decoding unit 104, video and voice synthesizer 105, video and voice output controller 106, still image holder 107, video input controller 108, and voice input controller 109. A display controller is configured by video and voice synthesizer 105 and video and voice output controller 106.

User instruction receiver 101 receives a signal transmitted from user operation input device 200, extracts selected site information included in the received signal, and outputs the extracted information to conference controller 102. The selected site information includes an IP address (or ISDN number) of each site participating in a video conference, and a flag indicating priority (whether it is a speech site or an audience site).

Conference controller 102 controls timing of data input to and output from communication controller 103, video and voice encoding/decoding unit 104, and video and voice synthesizer 105, based on the selected site information input from user instruction receiver 101. In addition, conference controller 102 outputs the selected site information input from user instruction receiver 101 to video and voice synthesizer 105. In addition, conference controller 102 controls signal transmission processing and call establishment processing of communication controller 103, and monitors whether or not video data is received, based on the selected site information.

Communication controller 103 operates at timing according to control of conference controller 102. Communication controller 103 establishes a call with the other videoconference devices 10-2 to 10-24. After establishing the call, communication controller 103 receives the video data and the voice data transmitted from the other videoconference devices 10-2 to 10-24 through network 20, and outputs the video data and the voice data to video and voice encoding/decoding unit 104. In addition, after establishing the call, communication controller 103 transmits the video data and the voice data input from video and voice encoding/decoding unit 104 to the other videoconference devices 10-2 to 10-24 through network 20. Communication controller 103 operates according to a predetermined communication protocol. The communication protocol is typically SIP or H.323.

Video and voice encoding/decoding unit 104 operates at the timing according to the control of conference controller 102. Video and voice encoding/decoding unit 104 encodes video data input from video and voice synthesizer 105 and voice data input from voice input controller 109, and outputs the encoded data to communication controller 103. In addition, video and voice encoding/decoding unit 104 decodes the video data and the voice data which are output from the other videoconference devices 10-2 to 10-24 and are input from communication controller 103, and outputs the decoded data to video and voice synthesizer 105.

Video and voice synthesizer 105 operates at timing according to the control of conference controller 102. Video and voice synthesizer 105 generates synthesized video data by synthesizing a plurality of pieces of video data in accordance with the number of sites of the selected site information input from conference controller 102, based on the video data which is output from the other videoconference devices 10-2 to 10-24 and is input from video and voice encoding/decoding unit 104 and the video data input from video input controller 108, and outputs the synthesized video data to video and voice output controller 106. Video and voice synthesizer 105 generates the synthesized video data such that a still image held in still image holder 107 is displayed, while receiving the video data from each of videoconference devices 10-2 to 10-24.

In addition, video and voice synthesizer 105 generates the synthesized voice data by synthesizing the voice data which is output from the other videoconference devices 10-2 to 10-24 and is input from video and voice encoding/decoding unit 104 and the voice data input from voice input controller 109, and outputs the synthesized voice data to video and voice output controller 106. In addition, video and voice synthesizer 105 outputs the video data input from video input controller 108 to video and voice encoding/decoding unit 104.

In addition, video and voice synthesizer 105 changes a screen layout of the synthesized video data, according to the number of sites of the selected site information, priorities of each site, and time measurement result of an embedded timer. A specific example of the layout change of the synthesized video data which is performed by video and voice synthesizer 105 will be described below.

Video and voice output controller 106 displays the synthesized video data input from video and voice synthesizer 105 on a screen of display device 500 and outputs the synthesized voice data from a speaker of display device 500 as a voice.

Still image holder 107 holds still image data for displaying a predetermined still image on the screen of display device 500 in advance, during a period in which the video data is received from the other videoconference devices 10-2 to 10-24.

Video input controller 108 outputs the video data input from video input device 300 to video and voice synthesizer 105.

Voice input controller 109 outputs the voice data input from voice input device 400 to video and voice encoding/decoding unit 104 and video and voice synthesizer 105.

Transition of Connection State of Videoconference Device

Next, transition of a connection state of videoconference device 10-1 will be described in detail with reference to FIG. 2.

Videoconference device 10-1 starts an operation by turning the power on. Videoconference device 10-1 is in a non-communication state shortly after the power is turned on (S1).

Videoconference device 10-1 is connected to another videoconference device 10-$i$ ($i$ is any one of integers from 2 to 24), in the non-communication state (S1), thereby, being in a one-to-one communication state (1:1 communication state) with the videoconference device 10-$i$ (S2). If the connection with videoconference device 10-$i$ in a communication state is cut in the 1:1 communication state (S2), videoconference device 10-1 enters the non-communication state (S1). Videoconference device 10-1 ends an operation by turning the power off in the non-communication state (S1).

In addition, videoconference device 10-1 is connected to still another videoconference device 10-$j$ ($j$ is any one of integers from 2 to 24 except for i) from the 1:1 communication state (S2), thereby entering a communication state (MCU communication state) with videoconference devices 10-$i$ and 10-$j$ at a plurality of sites (S3).

If the connection with videoconference device 10-$j$ in a communication state is cut, videoconference device 10-1 enters the one-to-one communication state (S2), and furthermore, if the connection with videoconference device 10-$i$ in a communication state is cut, videoconference device 10-1 enters the non-communication state (S1).

In addition, videoconference device 10-1 performs simultaneous signal transmission to all the other videoconference devices 10-2 to 10-24 in the non-communication state (S1), thereby, entering the communication state (MCU communication state) with all the other videoconference devices 10-2 to 10-24 (S3). If the connections with all the other videoconference devices 10-2 to 10-24 are simultaneously cut, videoconference devices 10 enter the non-communication state (S1).

A method of causing a user to manually input a signal transmission destination to videoconference device 10-1 at the time of signal transmission, a method of causing a user to select a list in which a plurality of pieces of signal transmission destination information stored in videoconference device 10-1 in advance are registered, or the like is considered as a method of performing the simultaneous signal transmission. In addition, an IP address, a telephone number, an identification code, or the like is considered as a method of specifying the signal transmission destination.

Operation of Videoconference Device

Figure 14:
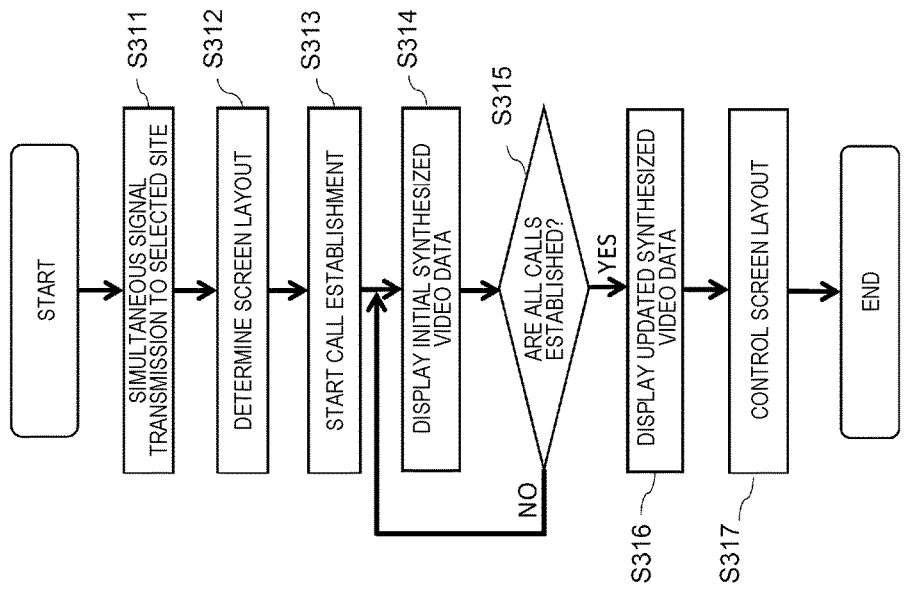
FIG. 14 is a flowchart illustrating an operation of a videoconference device according to Exemplary Embodiment 7 of the present disclosure.

Next, an operation of videoconference device 10-1 will be described in detail with reference to FIG. 14. FIG. 14 is a flow in a case where videoconference device 10-1 performs the simultaneous signal transmission to all the other videoconference devices 10-2 to 10-24.

First, user instruction receiver 101 receives a signal from user operation input device 200, extracts the selected site information included in the received signal, and outputs the selected site information to conference controller 102.

Conference controller 102 controls communication controller 103 such that the simultaneous signal transmission to videoconference devices 10-2 to 10-24 installed at each of N (N is an integer of 1 or more, N=23 in FIG. 14) sites of the selected site information is performed. Thereby, communication controller 103 performs the simultaneous signal transmission to videoconference devices 10-2 to 10-24 of the selected sites (S311). Specifically, in a case where the selected site information is information of one list in which a plurality of pieces of signal transmission destination information is recorded, conference controller 102 can recognize site number N based on the number of signal transmission destinations of the signal transmission destination information registered in the list.

In addition, video and voice synthesizer 105 determines a screen layout (Hereinafter, referred to as "initial screen layout") having (N+1) divided regions or more, based on the number of sites of the selected site information input from conference controller 102 (S312). One of the sites is associated with each of the divided regions.

In addition, communication controller 103 establishes a call with each of videoconference devices 10-2 to 10-24 of other sites (S313).

Next, video and voice synthesizer 105 generates the synthesized video data (hereinafter, referred to as "initial synthesized video data") such that the video data of videoconference device 10-1 input from video input controller 108 and the video data of the other videoconference devices 10-2 to 10-24 are respectively displayed in corresponding divided regions of the initial screen layout. Video and voice output controller 106 displays initial synthesized video data input from video and voice synthesizer 105 on a screen of display device 500 (S314) (refer to FIG. 16A). Until video data is received from the other videoconference devices 10-2 to 10-24, still image data is displayed in the corresponding divided regions.

After receiving the video data from all the other videoconference devices 10-2 to 10-24 (S315: YES), video and voice synthesizer 105 generates new synthesized video data (hereinafter referred to as "updated synthesized video data") having a screen layout different from that of the initial synthesized video data. Video and voice output controller 106 displays the updated synthesized video data input from video and voice synthesizer 105 on a screen of display device 500 (S316). The updated synthesized video data is video data of videoconference devices 10 of all speech sites, and the video data having a layout such that the video data of a part of the audience sites is displayed (refer to FIG. 16B).

Thereafter, videoconference device 10-1 performs processing of controlling the screen layout of the updated synthesized video data in video and voice synthesizer 105 and video and voice output controller 106, while bidirectional communication is continued (S317).

Figure 15:
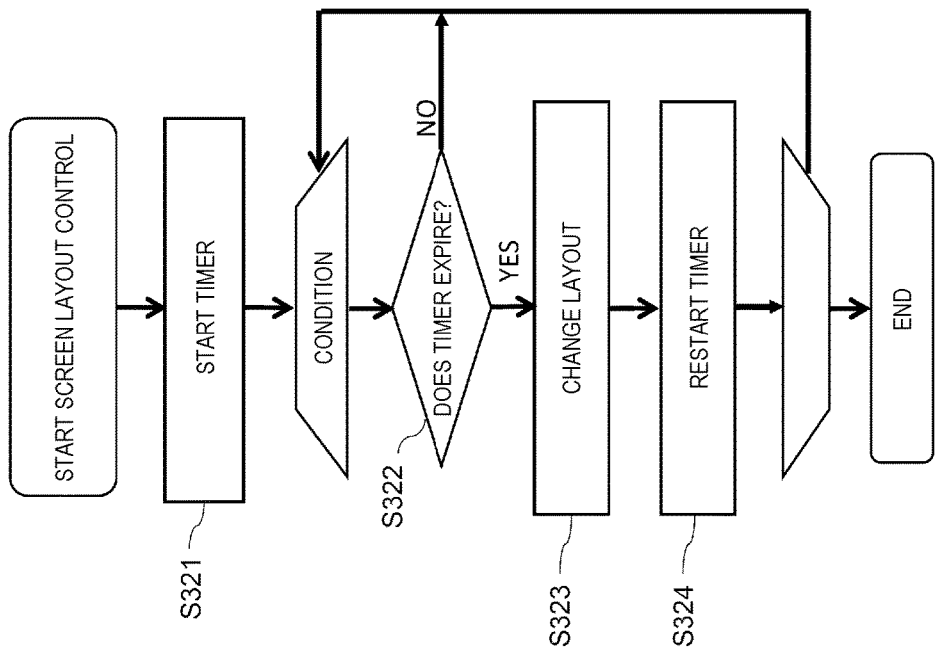
FIG. 15 is a flowchart illustrating a control operation of a screen layout of the videoconference device according to Exemplary Embodiment 7 of the present disclosure.

Hereinafter, a control operation (S317) of the screen layout of the updated synthesized video data will be described in detail with reference to FIG. 15.

First, video and voice synthesizer 105 starts a timer (S321).

In a case where the timer expires (predetermined time T is measured) (S322: YES), the screen layout of the updated synthesized video data is changed (refer to FIGS. 16C, 16D, and 16E). Video and voice output controller 106 displays the new updated synthesized video data input from video and voice synthesizer 105 on the screen of display device 500 (S323).

In addition, video and voice synthesizer 105 restarts the timer (S324). Thereafter, the flow returns to S322.

The layout change is not performed until the timer expires (S322: NO).

Specific Example of Layout Change

Next, a specific example of the layout change of the synthesized video data which is performed by video and voice synthesizer 105 will be described in detail with reference to FIG. 16. In FIG. 16, numbers marked in each region in the screen correspond to the site numbers. For example, the video data captured by videoconference device 10-1 of the site number 1 is displayed in the region marked "1".

Figures 16A, 16B, 16C, 16D, 16E:
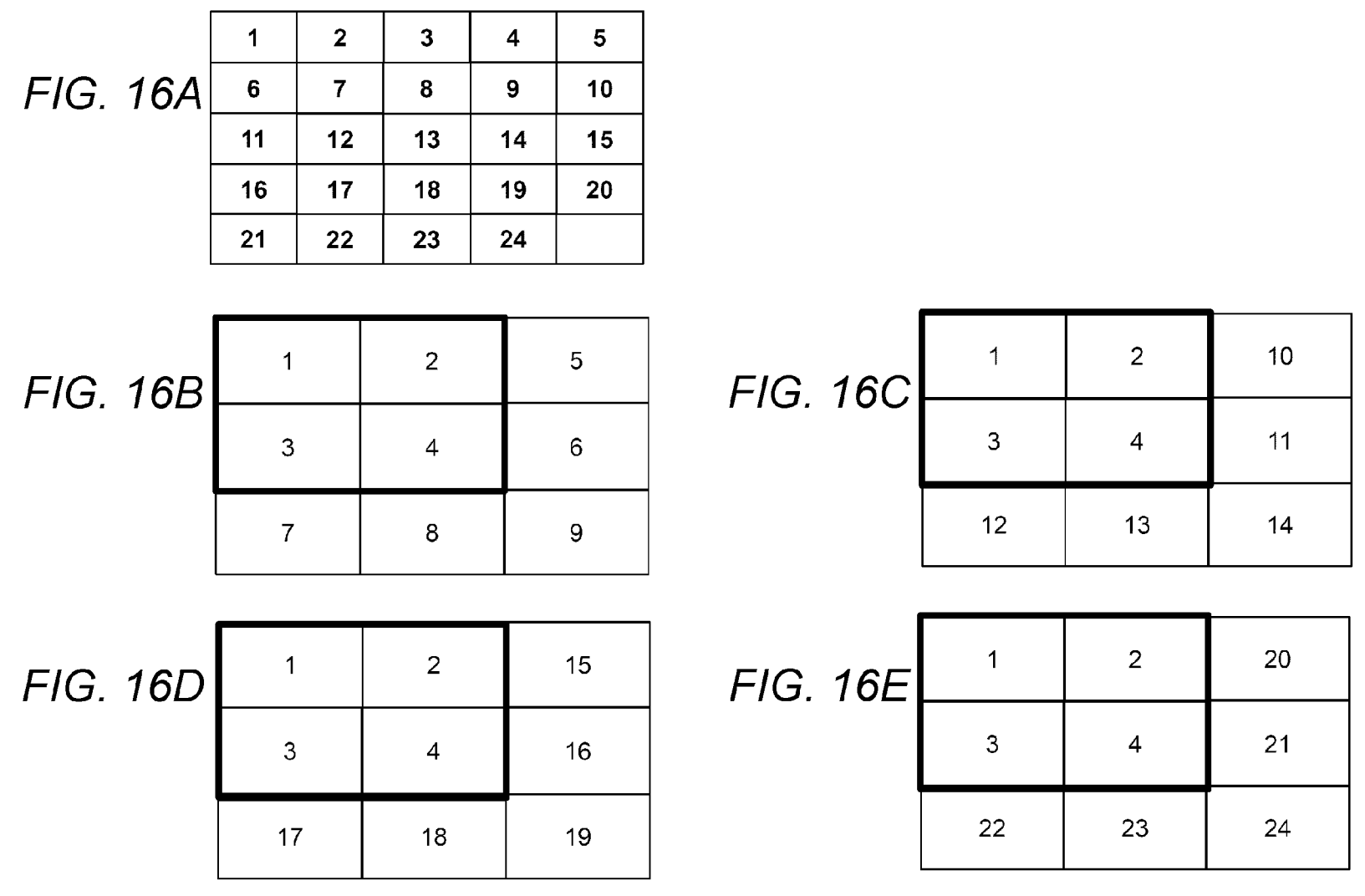

FIG. 16A illustrates an example of the initial synthesized video data. FIGS. 16B, 16C, 16D, and 16E respectively illustrate examples of the updated synthesized video data.

Videoconference device 10-1 performs simultaneous signal transmission based on the selected site information, and thereafter, displays the initial synthesized video data on the screen of display device 500 (S314 in FIG. 14). As illustrated in FIG. 16A, the initial synthesized video data has a layout such that video data (or still image data) of corresponding sites is displayed in each of divided regions equally divided into (N+1) or more (25 in FIG. 16A).

Videoconference device 10-1 establishes a call with all the sites (S315: YES in FIG. 14), and thereafter, displays the updated synthesized video data on the screen of display device 500 (S316 in FIG. 14). As illustrated in FIG. 16B, the updated synthesized video data has a layout such that video data of all the speech sites (site numbers 1, 2, 3, and 4 in FIG. 16B) is displayed in a first region (bold frame in FIG. 16B) and video data of the audience sites (site number 5, 6, 7, 8, and 9 in FIG. 5B) of predetermined number q (q=5 in FIG. 16B) is displayed in a second region other than the first region.

At a point of time when predetermined time T elapses after display of the updated synthesized video data of FIG. 16B starts (S322: YES in FIG. 15), videoconference device 10-1 switches the video data of the audience site of the second region while a display state of the first region is maintained, as illustrated in FIG. 16C, and changes the screen layout of the updated synthesized video data such that the video data of the other audience sites (site numbers 10, 11, 12, 13, and 14 in FIG. 16C) is displayed in the second region (S323 in FIG. 15).

Thereafter, videoconference device 10-1 changes the screen layout of the updated synthesized video data so as to switch the video data of the audience site of the second region, each time predetermined time T elapses, as illustrated in FIGS. 16D and 16E.

Furthermore, videoconference device 10-1 changes the screen layout of the updated synthesized video data so as to be FIG. 16B again, at a point of time when predetermined time T elapses from the start of the display of the updated synthesized video data of FIG. 16E.

As a result, the video data of all the audience sites is displayed on a screen for a constant time. The video data of all speech sites is always displayed on the screen.

In addition, as can be seen from comparison FIG. 16A and FIG. 16B, the updated synthesized video data for displaying only the video data of a part of the sites can increase a display area of each piece of the video data more than the initial synthesized video data for displaying the video data of all the sites.

Effect

As such, in the present exemplary embodiment, a screen layout is controlled such that video data of all speech sites is always displayed and video data of a part of audience sites is sequentially switched and displayed. Thereby, it is possible to always display the video data of all the speech sites on a screen and to display the video data of all the audience sites on the screen for a constant time. Since a display area of each piece of the video data can increase, as compared with a case where the video data of all the sites is displayed, the video data from each site can be displayed so as to be easily viewed to a viewer, even in a case where the number of sites is large.

Exemplary Embodiment 8

In Exemplary Embodiment 8, a case where a speech site is not fixed and all sites can become the speech site will be described.

Configuration and Connection Relationship of Videoconference Device

Configurations and connection relationships of videoconference devices 10 according to the present exemplary embodiment are the same as those which are described in Exemplary Embodiment 7 and illustrated in FIG. 1, and thus, description thereof will be omitted. However, the following functions are added to video and voice encoding/decoding unit 104 and video and voice synthesizer 105.

Video and voice encoding/decoding unit 104 detects a level of the voice data of each of videoconference devices 10-1 to 10-24 (level detector). Video and voice encoding/decoding unit 104 outputs the detected results to video and voice synthesizer 105.

Video and voice synthesizer 105 determines priority (whether it is a speech site or an audience site) of each site depending on a level of the voice data.

Operation of Videoconference Device

The entire operation of videoconference device 10-1 according to the present exemplary embodiment is the same as the operation which is described in Exemplary Embodiment 7 and is illustrated in FIG. 14, and thus, description thereof will be omitted. In the present exemplary embodiment, only a control operation (S317) of the screen layout of the updated synthesized video data is different from the control operation of Exemplary Embodiment 7.

Figure 17:
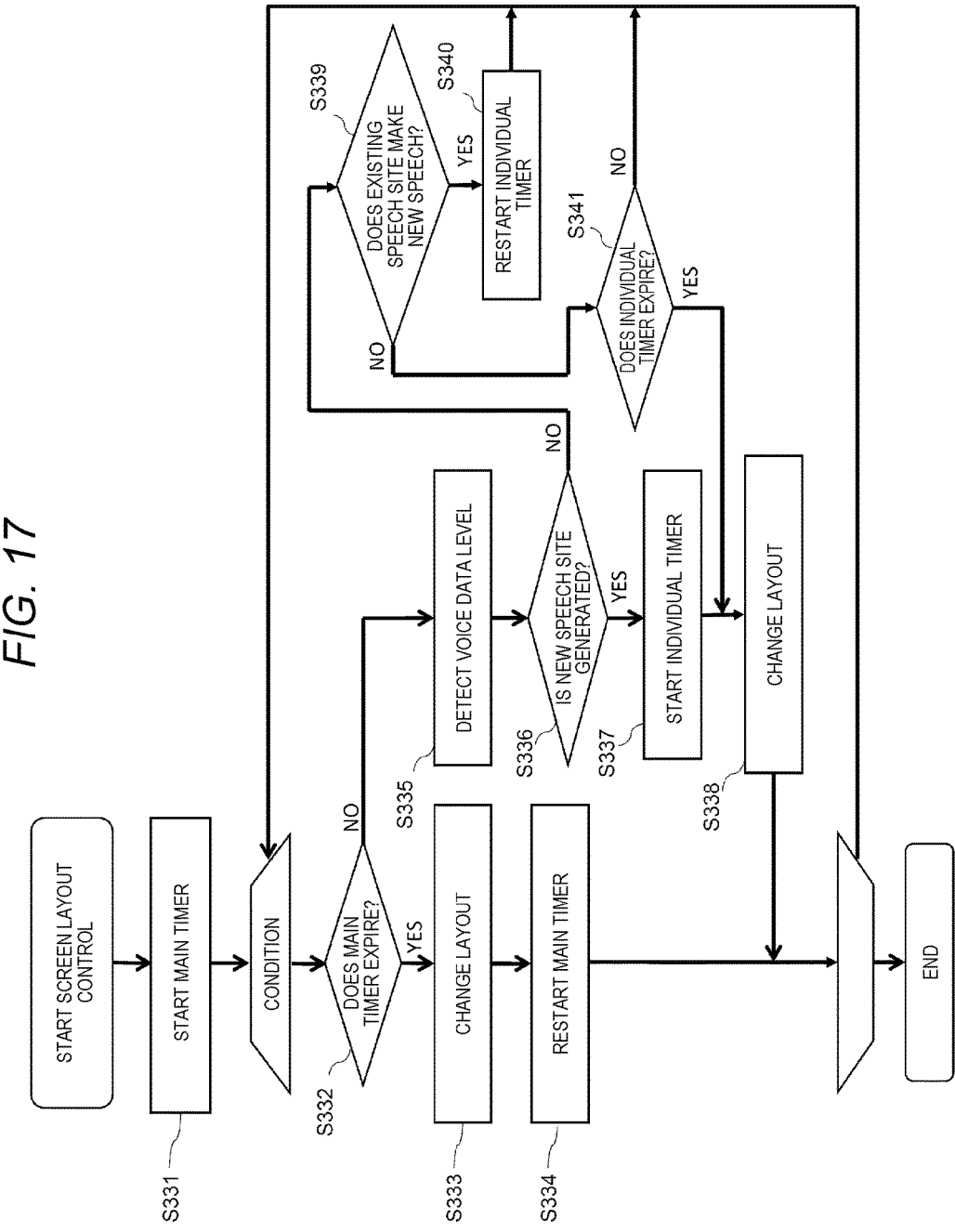
FIG. 17 is a flowchart illustrating a control operation of a screen layout of a videoconference device according to Exemplary Embodiment 8 of the present disclosure.

Hereinafter, the control operation (S317) of the screen layout of the updated synthesized video data of videoconference device 10-1 according to the present exemplary embodiment will be described in detail with reference to FIG. 17.

First, video and voice synthesizer 105 starts a main timer (S331).

In a case where the main timer expires (predetermined time T1 is measured) (S332: YES), the screen layout of the updated synthesized video data is changed such that the video data of the audience site of the second region is switched. Video and voice output controller 106 displays new updated synthesized video data input from video and voice synthesizer 105 on the screen of display device 500 (S333).

In addition, video and voice synthesizer 105 restarts the timer (S334). Thereafter, the flow returns to S332.

In addition, at the timing when the main timer does not expire (S332: NO), video and voice encoding/decoding unit 104 detects a level of the voice data of each of videoconference devices 10-1 to 10-24, and outputs the detected result to video and voice synthesizer 105 (S335).

Video and voice synthesizer 105 sets one of videoconference devices 10-1 to 10-24 whose level of the voice data is higher than or equal to a threshold as the speech site, and sets the others as the audience sites. Video and voice synthesizer 105 determines whether or not a new speech site is generated (S336).

In a case where a new speech site is generated (S336: YES), video and voice synthesizer 105 starts an individual timer for the speech site (S337). In addition, video and voice synthesizer 105 changes the screen layout of the updated synthesized video data such that the video data of the speech site is displayed in the first region. Video and voice output controller 106 displays the new updated synthesized video data input from video and voice synthesizer 105 on the screen of display device 500 (S338). Thereafter, the flow returns to S332.

Meanwhile, in a case where a new speech site is not generated (S336: NO), video and voice synthesizer 105 determines whether or not a participant at the existing speech site makes a new speech (S339).

In a case where the participant at the existing speech site makes the new speech (S339: YES), video and voice synthesizer 105 restarts the individual timer (S340). Thereafter, the flow returns to S332.

Meanwhile, in a case where the participant at the existing speech site does not make the new speech (S339: NO), video and voice synthesizer 105 determines whether or not the individual timer expires (predetermined time T2 is measured) (S341).

In a case where the individual timer expires (S341: YES), video and voice synthesizer 105 changes the screen layout of the updated synthesized video data such that the video data of the speech site is not displayed in the first region. Video and voice output controller 106 displays the new updated synthesized video data input from video and voice synthesizer 105 on the screen of display device 500 (S338). Thereafter, the flow returns to S332.

In a case where the individual timer does not expire (S341: NO), the flow returns to S332.

Specific Example of Layout Change

Next, a specific example of the layout change of the synthesized video data which is performed by video and voice synthesizer 105 will be described in detail with reference to FIG. 18. In FIG. 18, numbers marked in each region in the screen correspond to the site numbers. For example, the video data captured by videoconference device 10-1 of the site number 1 is displayed in the region marked "1".

FIGS. 18A, 18B, 18C, 18D, 18E, and 18F respectively illustrate examples of the updated synthesized video data.

Videoconference device 10-1 establishes a call with all the sites (S315: YES in FIG. 14), and thereafter, displays the updated synthesized video data on the screen of display device 500 (S316 in FIG. 14). As illustrated in FIG. 18A, the updated synthesized video data has a layout such that video data of all the speech sites (site number 1 in FIG. 18A) is displayed in a first region (bold frame in FIG. 18A) and video data of the audience sites (site number 2, 3, 4, 5, and 6 in FIG. 18A) of predetermined number q (q=5 in FIG. 18A) is displayed in a second region other than the first region. At this time, a layout may be performed such a display area of the video data of the speech site is larger than a display area of the video data of the audience site.

At a point of time when predetermined time T1 elapses after display of the updated synthesized video data of FIG. 18A starts (S332: YES in FIG. 17), videoconference device 10-1 switches the video data of the audience site of the second region while a display state of the first region is maintained, as illustrated in FIG. 18B, and changes the screen layout of the updated synthesized video data such that the video data of the other audience sites (site numbers 7, 8, 9, 10, and 11 in FIG. 18B) is displayed in the second region (S333 in FIG. 17).

Thereafter, in a case where a new speech site (site number 2) is generated (S336: YES in FIG. 17) before predetermined time T1 elapses after display of the updated synthesized video data of FIG. 18B starts (S332: NO in FIG. 17), videoconference device 10-1 changes the screen layout of the updated synthesized video data such that video data of a new speech site is added to the first region (S338 in FIG. 17), as illustrated in FIG. 18C. At this time, in a case where the number of divided regions in the second region increases or decreases, the number of audience sites for displaying the video data in accordance with this is increased or decreased. In the example of FIG. 18C, the video data of the site numbers 12, 13, and 14 are additionally displayed.

Thereafter, in a case where a participant of the site number 2 makes a new speech (S339: YES in FIG. 17) and predetermined time T1 elapses after the display of the updated synthesized video data of FIG. 18C starts (S332: YES in FIG. 17) before predetermined time T2 elapses since the most recent speech, videoconference device 10-1 switches the video data of the audience site of the second region while maintaining the display state of the first region, and changes the screen layout of the updated synthesized video data such that the video data of the other audience sites (site numbers 15, 16, 17, 18, 19, 20, 21, and 22 in FIG. 18D) of the second region is displayed (S333 in FIG. 17), as illustrated in FIG. 18D.

Thereafter, in a case where a participant of the site number 2 does not make a new speech (S339: NO in FIG. 17) and predetermined time T2 elapses since the most recent speech (S341: YES in FIG. 17), videoconference device 10-1 changes the screen layout of the updated synthesized video data such that the video data of the speech site 2 from the first region is removed (S338 in FIG. 7), as illustrated in FIG. 18E.

Thereafter, at a point of time when predetermined time T1 elapses, videoconference device 10-1 changes the screen layout of the updated synthesized video data such that the video data of the audience site of the second region is switched, as illustrated in FIG. 18F.

As a result, the video data of all the audience sites is displayed on the screen for a constant time. The video data of all the speech sites is always displayed on the screen.

In addition, the updated synthesized video data for displaying only the video data of a part of the sites can be larger than the initial synthesized video data for displaying the video data of all the sites, in display area of each piece of video data.

Effect

As such, in the present exemplary embodiment, a screen layout is controlled such that video data of all speech sites is always displayed and video data of a part of audience sites is sequentially switched and displayed. Furthermore, in the present exemplary embodiment, the screen layout is controlled such that a site where a participant speaks is added to the speech site, video data of the site is displayed, a site where there is no speech of a participant for a constant time from the most recent speech is removed from the speech site, and displaying the video data of the site stops. Thereby, it is possible to always display the video data of all the speech sites on a screen and to display the video data of all the audience sites on the screen for a constant time, even in a case where the speech site is not fixed. Since a display area of each piece of the video data can increase, as compared with a case where the video data of all the sites is displayed, the video data from each site can be displayed so as to be easily viewed to a viewer, even in a case where the number of sites is large.

Exemplary Embodiment 9

In Exemplary Embodiment 9, a case will be described in which a speech site where a participant, who is mainly making speaking, is displayed and an audience site where a participant, who is listening without basically speaking, is displayed are determined in advance and a participant at the audience site may make a speech such as a question.

Configuration and Connection Relationship of Videoconference Device

Configurations and connection relationships of videoconference devices 10 according to the present exemplary embodiment are the same as those which are described in Exemplary Embodiment 7 and are illustrated in FIG. 1, and thus, description thereof will be omitted. In addition, additional functions of video and voice encoding/decoding unit 104 and video and voice synthesizer 105 are the same as those described in Exemplary Embodiment 8, and thus, description thereof will be omitted.

Operation of Videoconference Device

The entire operation of videoconference device 10-1 according to the present exemplary embodiment is the same as the operation which is described in Exemplary Embodiment 7 and is illustrated in FIG. 14, and thus, description thereof will be omitted. In addition, the control operation (S317) of the screen layout of the updated synthesized video data according to the present exemplary embodiment is the same as the control operation which is described in Exemplary Embodiment 8 and is illustrated in FIG. 17, and thus, description thereof will be omitted.

Specific Example of Layout Change

Next, a specific example of the layout change of the synthesized video data which is performed by video and voice synthesizer 105 will be described in detail with reference to FIG. 19. In FIG. 19, numbers marked in each region in the screen correspond to the site numbers. For example, the video data captured by videoconference device 10-1 of the site number 1 is displayed in the region marked "1".

FIGS. 19A, 19B, 19C, 19D, 19E, and 19F respectively illustrate examples of the updated synthesized video data.

FIGS. 19A and 19B are common to FIGS. 18A and 18B described in Exemplary Embodiment 7, and description thereof will be omitted.

In a case where the audience site of the site number 2 makes a speech such as a question (S336: YES in FIG. 17) before predetermined time T1 elapses after the display of the updated synthesized video data of FIG. 19B starts (S332: NO in FIG. 17), the audience site of the site number 2 becomes a new speech site, and videoconference device 10-1 changes the screen layout of the updated synthesized video data such that a part (a region where the video data of the site number 7 of FIG. 19B is displayed) of the second region becomes the first region and the video data of a new speech site (site number 2) is added thereto (S338 in FIG. 17), as illustrated in FIG. 19C.

Thereafter, in a case where the participant of the site number 2 makes a new speech (S339: YES in FIG. 17) and predetermined time T1 elapses after the display of the updated synthesized video data in FIG. 18C starts (S332: YES in FIG. 17) before predetermined time T2 elapses since the most recent speech, videoconference device 10-1 switches the video data of the audience site of the second region while maintaining a display state of the first region, as illustrated in FIG. 19D, and changes the screen layout of the updated synthesized video data such that the video data of the other audience site (site numbers 12, 13, 14, and 15 in FIG. 19D) is displayed in the second region (S333 in FIG. 17).

Thereafter, in a case where the participant of the site number 2 does not make a new speech (S339: NO in FIG. 17) and predetermined time T2 elapses since the most recent speech (S341: YES in FIG. 17), videoconference device 10-1 removes the video data of the speech site 2 from the first region (S338 in FIG. 17).

Thereafter, at a point of time when predetermined time T1 elapses, videoconference device 10-1 changes the screen layout of the updated synthesized video data such that the video data of the audience site of the second region is switched, as illustrated in FIG. 19E.

Thereafter, furthermore, at a point of time when predetermined time T1 elapses, videoconference device 10-1 changes the screen layout of the updated synthesized video data such that the video data of the audience site of the second region is switched, as illustrated in FIG. 19F.

As a result, the video data of all the audience sites is displayed on the screen for a constant time. The video data of all the speech sites is always displayed on the screen.

In addition, the updated synthesized video data for displaying only the video data of a part of the sites can be larger than the initial synthesized video data for displaying the video data of all the sites, in display area of each piece of video data.

Effect

As such, in the present exemplary embodiment, a screen layout is controlled such that video data of all speech sites is always displayed and video data of a part of audience sites is sequentially switched and displayed. Furthermore, in the present exemplary embodiment, the screen layout is controlled such that a site where a participant makes a speech is added to the speech site, video data of the site is displayed, a site where there is no speech of a participant for a constant time from the most recent speech is removed from the speech site, and displaying the video data of the site stops. Thereby, it is possible to always display the video data of all the speech sites on a screen and to display the video data of all the audience sites on the screen for a constant time, even in a case where the speech site is not fixed. Since a display area of each piece of the video data can increase, as compared with a case where the video data of all the sites is displayed, the video data from each site can be displayed so as to be easily viewed to a viewer, even in a case where the number of sites is large.

In the present disclosure, types, arrangement, the number, and the like of members are not limited to the aforementioned embodiments, and the present disclosure may be appropriately modified in a range without departing from the gist of the disclosure, such as appropriately replacing the configuration elements with configuration elements having the same action effects.

Specifically, in the aforementioned exemplary embodiment, a case where a still image is displayed until video is displayed is described, but the present disclosure is not limited to this, and character information such as a message other than the still image may be displayed, or a black screen may be displayed as it is.

In addition, in the aforementioned embodiment, a videoconference system in which the number of sites that can be simultaneously connected is 24 is described as an example, but the present disclosure is not limited to the number of sites that can be simultaneously connected.

In addition, in the present disclosure, the video data for display and the video data for transmission can be individually generated by setting of a user. For example, the video data output from video input controller 108 can be set as the video data for display, and the video data synthesized by video and voice synthesizer 105 can be set as the video data for transmission.

The present disclosure is suitable for being used for a videoconference device that is provided at a host site and can be simultaneously connected to partner devices of a plurality of sites different from the host site.

What is claimed is:

1. A videoconference device which is provided at a host site and is simultaneously connectable to videoconference devices of a plurality of other sites, the videoconference device comprising:
a video input unit that acquires video data by capturing video of the host site;
a voice input unit that acquires voice data by picking up voices of the host site;
a communication controller that receives video data and voice data from the videoconference devices, respectively, of the plurality of other sites; and
a display controller that determines a screen layout depending on the number of sites participating in a videoconference, generates synthesized video data by synthesizing the video data of the sites in accordance with the screen layout, displays the synthesized video data on a screen, starts a main timer,
wherein the videoconference device further includes a level detector that detects a level of the voice data,
the display controller determines, for each site, whether a level of the voice data is higher than or equal to a threshold, determines any site having voice data higher than or equal to the threshold as a speech site, and determines any site having voice data not higher than or equal to the threshold as an audience site,
wherein the display controller generates the synthesized video data so as to display video data of any site determined to be a speech site, and video data of a first group of the audience sites in such a manner that displayed speech sites are highlighted more than the first group of audience sites,
wherein the display controller further generates, after expiration of the main timer, the synthesized video data so as to display video data of any site determined to be a speech site, and video data of a second group of the audience sites in such a manner that displayed speech sites are highlighted more than the second group of audience sites, and
wherein the display controller determines for each speech site, whether a level of the voice data has been lower than the threshold for a predetermined amount of time, and determines any speech site having voice data lower than the threshold for the predetermined amount of time as an audience site that is no longer to be highlighted.

2. The videoconference device of claim 1, wherein the display controller generates the synthesized video data so as to display video data of any site determined to be a speech site, and video data of the first group of the audience sites in such a manner that a display area of displayed speech sites is larger than a display area of the first group of audience sites.

3. The videoconference device of claim 1, wherein the display controller generates the synthesized video data so as to display video data of any site determined to be a speech site, and video data of the first group of the audience sites in such a manner that a display method of displayed speech sites differs from a display method of the first group of audience sites.

4. The videoconference device of claim 2, wherein the display controller generates the synthesized video data so as to display video data of any site determined to be a speech site, and video data of the first group of the audience sites in such a manner that a display position of displayed speech sites is changed.

5. A videoconference device which is provided at a host site and is simultaneously connectable to videoconference devices of a plurality of other sites, the videoconference device comprising:
a video input unit that acquires video data by capturing video of the host site;
a voice input unit that acquires voice data by picking up voices of the host site;

a communication controller that receives each piece of the video data and the voice data from conference terminal devices of the plurality of other sites; and a display controller that determines a screen layout depending on the number of sites participating in a videoconference, generates synthesized video data by synthesizing the video data of the sites in accordance with the screen layout, displays the synthesized video data on a screen, starts a main timer, wherein the videoconference device further includes a level detector that detects a level of the voice data, wherein the display controller generates the synthesized video data so as to, in a case where a speech site, having a participant who mainly speaks, is displayed and where an audience site, having a participant who only listens without basically speaking, is displayed are determined in advance, display video data of the speech site and the audience site in such a manner that a display area of the speech site is larger than a display area of the audience site, wherein the audience site has voice data higher than or equal to a threshold, wherein the display controller generates the synthesized video data so as to display video data of the audience site in such a manner that the display area of the audience site is larger than display areas of a first group of other audience sites, of the plurality of other sites having voice data lower than the threshold, and is smaller than the display area of the speech site, wherein the display controller generates the synthesized video data so as to, after expiration of the main timer, display video data of the audience site in such a manner that the display area of the audience site is larger than display areas of a second group of other audience sites, of the plurality of other sites having voice data lower than the threshold, and is smaller than the display area of the speech site, and wherein the display controller determines for the speech site, whether the voice data has been lower than the threshold for a predetermined amount of time, and if the speech site has been lower than the threshold for the predetermined amount of time, determines the speech site as a new audience site that is no longer to have a display area that is larger than the display area of the audience site.

6. The videoconference device of claim 1, wherein the display controller still further generates, prior to expiration of the main timer and if one of the first group of audience sites voice data is higher than the threshold, the synthesized video data so as to display video data of the speech sites in such a manner that the displayed speech sites are modified to include the one of the first group of audience sites having the level of the voice data higher than the threshold.

7. The videoconference device of claim 6, wherein the display controller still further generates, the synthesized video data such that display of video data of the audience sites is modified to include a third group of audience sites not including the one of the first group of audience sites having voice data higher than the threshold.

8. The videoconference device of claim 7,
wherein the display controller additionally starts an individual timer based on the one of the first group of audience sites having voice data higher than the threshold, and wherein the display controller further generates, after expiration of the individual timer and if the one of the first group of audience sites has had a level of the voice data lower than the threshold for the duration of the individual timer, the synthesized video data such that display of video data of the speech sites is further modified to not include the one of the first group of audience sites having the voice data higher than the threshold.

9. A method of providing a videoconference at a host site that is simultaneously connectable to videoconference devices of a plurality of other sites, the method comprising:

acquiring, via a video input unit, video data by capturing video of the host site;

acquiring, via a voice input unit, voice data by picking up voices of the host site;

receiving, via a communication controller, video data and voice data from the videoconference devices, respectively, of the plurality of other sites; and determining, via a display controller, a screen layout depending on the number of sites participating in a videoconference;

generating, via the display controller, synthesized video data by synthesizing the video data of the sites in accordance with the screen layout;

displaying, via the display controller, the synthesized video data on a screen;

starting, via the display controller, a main timer;

starting, via the display controller, an individual timer;

detecting, via a level detector, a level of the voice data; and determining, via the display controller, for each site, whether a level of the voice data is higher than or equal to a threshold;

determining, via the display controller, any site having voice data higher than or equal to the threshold as a speech site;

determining, via the display controller, any site having voice data not higher than or equal to the threshold as an audience site;

determining, via the display controller, whether a level of the voice data has been lower than the threshold for a predetermined amount of time; and determining, via the display controller, any speech site having voice data lower than the threshold for the predetermined amount of time, wherein the generating, via the display controller, synthesized video data by synthesizing the video data of the sites in accordance with the screen layout comprises generating the synthesized video data so as to display video data of any site determined to be a speech site, and video data of a first group of the audience sites in such a manner that displayed speech sites are highlighted more than the first group of audience sites, wherein the generating, via the display controller, synthesized video data by synthesizing the video data of the plurality of other sites in accordance with the screen layout further comprises generating, after expiration of the main timer, the synthesized video data so as to display video data of any site determined to be a speech site, and video data of a second group of the audience sites in such a manner that displayed speech sites are highlighted more than the second group of audience sites, wherein the determining whether a level of the voice data has been lower than the threshold for a predetermined amount of time comprises determining for each speech site, whether voice data has been lower than the threshold for a predetermined amount of time, and wherein the determining any speech site having voice data lower than the threshold for the predetermined amount of time comprises determining any speech site having voice data lower than the threshold for the predetermined amount of time as an audience site that is no longer to be highlighted.

10. The method of claim 9, wherein generating, via the display controller, synthesized video data by synthesizing the video data of the sites in accordance with the screen layout further comprises generating the synthesized video data so as to display video data of any site determined to be a speech site, and video data of a first group of the audience sites in such a manner that a display area of displayed speech sites is larger than a display area of the first group of audience sites.

11. The method of claim 9, wherein generating, via the display controller, synthesized video data by synthesizing the video data of the sites in accordance with the screen layout further comprises generating the synthesized video data so as to display video data of any site determined to be a speech site, and video data of a first group of the audience sites in such a manner that a display method of displayed speech sites differs from a display method of the first group of audience sites.

12. The method of claim 10, wherein generating, via the display controller, synthesized video data by synthesizing the video data of the sites in accordance with the screen layout further comprises generating the synthesized video data so as to display video data of any site determined to be a speech site, and video data of a first group of the audience sites in such a manner that a display position of displayed speech sites is changed.

13. The method of claim 9, wherein the generating, via the display controller, synthesized video data by synthesizing the video data of the plurality of other sites in accordance with the screen layout still further comprises generating, prior to expiration of the main timer and if one of the first group of audience sites voice data is higher than the threshold, the synthesized video data so as to display video data of the speech sites in such a manner that the displayed speech sites are modified to include the one of the first group of audience sites having the level of the voice data higher than the threshold.

14. The method of claim 13, wherein the generating, via the display controller, synthesized video data by synthesizing the video data of the plurality of other sites in accordance with the screen layout further comprises generating, the synthesized video data such that display of video data of the audience sites is modified to include a third group of audience sites not including the one of the first group of audience sites having voice data higher than the threshold.

15. The method of claim 14, further comprising:
starting, via the display controller, a second individual timer based on the one of the first group of audience sites having a level of the voice data higher than the threshold, and
wherein the generating, via the display controller, synthesized video data by synthesizing the video data of the plurality of other sites in accordance with the screen layout further comprises generating, after expiration of the individual timer and if the one of the first group of audience sites has had a level of the voice data lower than the threshold for the duration of the individual timer, the synthesized video data such that display of video data of the speech sites is further modified to not include the one of the first group of audience sites having the voice data higher than the threshold.

* * * * *